United States Patent
Fuehring et al.

(10) Patent No.: US 10,954,753 B2
(45) Date of Patent: Mar. 23, 2021

(54) TOOL COUPLER WITH ROTATING COUPLING METHOD FOR TOP DRIVE

(71) Applicant: Weatherford Technology Holdings, LLC, Houston, TX (US)

(72) Inventors: Ernst Fuehring, Lindhorst (DE); Martin Liess, Seelze (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 819 days.

(21) Appl. No.: 15/445,758

(22) Filed: Feb. 28, 2017

(65) Prior Publication Data

US 2018/0245433 A1    Aug. 30, 2018

(51) Int. Cl.
E21B 41/00    (2006.01)
E21B 17/046    (2006.01)
E21B 3/02    (2006.01)
F16B 7/18    (2006.01)

(52) U.S. Cl.
CPC .............. *E21B 41/00* (2013.01); *E21B 3/02* (2013.01); *E21B 17/046* (2013.01); *F16B 7/187* (2013.01)

(58) Field of Classification Search
CPC ........... E21B 41/00; E21B 17/046; E21B 3/02
See application file for complete search history.

(56) References Cited

U.S. PATENT DOCUMENTS

| | | |
|---|---|---|
| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

PCT Invitaiton to Pay Additional Fees for International Application No. PCT/US2008/086699; dated Sep. 9, 2009; 7 total pages.

(Continued)

*Primary Examiner* — James M Hewitt, II
(74) *Attorney, Agent, or Firm* — Patterson + Sheridan, LLP

(57) ABSTRACT

Apparatus and methods are provided for coupling a first component to a second component of a tool coupler. A first component includes a ring coupler having mating features and rotatable between first and second positions; an actuator to rotate the ring coupler between the positions; and a second component comprising a profile complementary to the ring coupler. A method includes inserting a central shaft of the first component into a housing of the second component; rotating a ring coupler around the central shaft; and engaging mating features of the ring coupler with a profile. A method also includes clamping a profile using the ring coupler and a second ring coupler. A method also includes moving a second ring coupler vertically relative to the housing to engage a profile.

27 Claims, 17 Drawing Sheets

(56) References Cited

U.S. PATENT DOCUMENTS

| | | |
|---|---|---|
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jurgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |

(56) References Cited

U.S. PATENT DOCUMENTS

| | | |
|---|---|---|
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 * | 1/2014 | Robichaux ............ E21B 17/05 166/285 |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 * | 12/2015 | Slaughter, Jr. .......... F16D 1/033 |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0163822 A1 | 8/2004 | Zhang et al. |
| 2004/0216924 A1 | 11/2004 | Pietras et al. |
| 2004/0222901 A1 | 11/2004 | Dodge et al. |
| 2005/0000691 A1 | 1/2005 | Giroux et al. |
| 2005/0087368 A1 | 4/2005 | Boyle et al. |
| 2005/0173154 A1 | 8/2005 | Lesko |
| 2005/0206163 A1 * | 9/2005 | Guesnon ............ F16L 37/107 285/402 |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0001549 A1 | 1/2006 | Shah et al. |
| 2006/0037784 A1 | 2/2006 | Walter et al. |
| 2006/0113083 A1 * | 6/2006 | Connell ................ E21B 17/06 166/377 |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2006/0290528 A1 | 12/2006 | MacPherson et al. |
| 2007/0017671 A1 | 1/2007 | Clark et al. |
| 2007/0029112 A1 | 2/2007 | Li et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0137853 A1 | 6/2007 | Zhang et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0188344 A1 | 8/2007 | Hache et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2007/0263488 A1 | 11/2007 | Clark |
| 2008/0006401 A1 | 1/2008 | Buytaert et al. |
| 2008/0007421 A1 | 1/2008 | Liu et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0115623 A1 | 5/2009 | Macpherson et al. |
| 2009/0146836 A1 | 6/2009 | Santoso et al. |
| 2009/0151934 A1 | 6/2009 | Heidecke et al. |
| 2009/0159294 A1 | 6/2009 | Abdollahi et al. |
| 2009/0173493 A1 | 7/2009 | Hutin et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 * | 11/2009 | Alikin .................. E21B 17/085 166/367 |
| 2009/0274544 A1 | 11/2009 | Liess |
| 2009/0274545 A1 | 11/2009 | Liess et al. |
| 2009/0289808 A1 | 11/2009 | Prammer |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0097890 A1 | 4/2010 | Sullivan et al. |
| 2010/0101805 A1 | 4/2010 | Angelle et al. |
| 2010/0116550 A1 | 5/2010 | Hutin et al. |
| 2010/0171638 A1 | 7/2010 | Clark |
| 2010/0171639 A1 | 7/2010 | Clark |
| 2010/0172210 A1 | 7/2010 | Clark |
| 2010/0182161 A1 | 7/2010 | Robbins et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0213942 A1 | 8/2010 | Lazarev |
| 2010/0236777 A1 | 9/2010 | Partouche et al. |
| 2010/0271233 A1 | 10/2010 | Li et al. |
| 2010/0328096 A1 | 12/2010 | Hache et al. |
| 2011/0017512 A1 | 1/2011 | Codazzi |
| 2011/0018734 A1 | 1/2011 | Varveropoulos et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0198076 A1 | 8/2011 | Villreal et al. |
| 2011/0214919 A1 | 9/2011 | McClung, III |
| 2011/0280104 A1 | 11/2011 | McClung, III |
| 2012/0013481 A1 | 1/2012 | Clark |
| 2012/0014219 A1 | 1/2012 | Clark |

(56) References Cited

U.S. PATENT DOCUMENTS

| | | |
|---|---|---|
| 2012/0048574 A1 | 3/2012 | Wiens et al. |
| 2012/0126992 A1 | 5/2012 | Rodney et al. |
| 2012/0152530 A1 | 6/2012 | Wiedecke et al. |
| 2012/0160517 A1 | 6/2012 | Bouligny et al. |
| 2012/0166089 A1 | 6/2012 | Ramshaw et al. |
| 2012/0212326 A1 | 8/2012 | Christiansen et al. |
| 2012/0234107 A1 | 9/2012 | Pindiprolu et al. |
| 2012/0274477 A1 | 11/2012 | Prammer |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietas |
| 2013/0192357 A1 | 8/2013 | Ramshaw et al. |
| 2013/0207382 A1* | 8/2013 | Robichaux ............ E21B 17/043 285/95 |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Ellis |
| 2013/0275100 A1 | 10/2013 | Ellis et al. |
| 2013/0278432 A1 | 10/2013 | Shashoua et al. |
| 2013/0299247 A1 | 11/2013 | Küttel et al. |
| 2014/0083768 A1 | 3/2014 | Moriarty et al. |
| 2014/0083769 A1 | 3/2014 | Moriarty et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0246237 A1 | 9/2014 | Prammer |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2014/0374122 A1* | 12/2014 | Fanguy ................. E21B 17/043 166/380 |
| 2015/0014063 A1 | 1/2015 | Simanjuntak et al. |
| 2015/0053424 A1 | 2/2015 | Wiens et al. |
| 2015/0075770 A1 | 3/2015 | Fripp et al. |
| 2015/0083391 A1 | 3/2015 | Bangert et al. |
| 2015/0090444 A1 | 4/2015 | Partouche et al. |
| 2015/0107385 A1 | 4/2015 | Mullins et al. |
| 2015/0131410 A1 | 5/2015 | Clark |
| 2015/0275657 A1 | 10/2015 | Deffenbaugh et al. |
| 2015/0285066 A1 | 10/2015 | Keller et al. |
| 2015/0292319 A1 | 10/2015 | Disko et al. |
| 2015/0337648 A1 | 11/2015 | Zippel et al. |
| 2015/0337651 A1 | 11/2015 | Prammer |
| 2016/0024862 A1 | 1/2016 | Wilson et al. |
| 2016/0032715 A1 | 2/2016 | Mueller et al. |
| 2016/0053610 A1 | 2/2016 | Switzer et al. |
| 2016/0138348 A1 | 5/2016 | Kunec |
| 2016/0145954 A1 | 5/2016 | Helms et al. |
| 2016/0177639 A1 | 6/2016 | McIntosh et al. |
| 2016/0215592 A1 | 7/2016 | Helms et al. |
| 2016/0222731 A1 | 8/2016 | Bowley et al. |
| 2016/0230481 A1 | 8/2016 | Misson et al. |
| 2016/0290049 A1* | 10/2016 | Kedare ................... E21B 7/067 |
| 2016/0291188 A1 | 10/2016 | Lim |
| 2016/0326867 A1 | 11/2016 | Prammer |
| 2016/0333682 A1 | 11/2016 | Griffing et al. |
| 2017/0037683 A1 | 2/2017 | Heidecke et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |
| 2017/0074075 A1 | 3/2017 | Liess |
| 2017/0211327 A1 | 7/2017 | Wern et al. |
| 2017/0211343 A1 | 7/2017 | Thiemann |
| 2017/0248009 A1 | 8/2017 | Fripp et al. |
| 2017/0248012 A1 | 8/2017 | Donderici et al. |
| 2017/0284164 A1 | 10/2017 | Holmes et al. |
| 2017/0335681 A1 | 11/2017 | Nguyen et al. |
| 2017/0350199 A1* | 12/2017 | Pallini .................. E21B 17/043 |
| 2017/0356288 A1 | 12/2017 | Switzer et al. |
| 2018/0087374 A1 | 3/2018 | Robson et al. |
| 2018/0087375 A1 | 3/2018 | Segura Dominguez |
| 2018/0135409 A1 | 5/2018 | Wilson et al. |
| 2018/0252095 A1 | 9/2018 | Pridat et al. |

FOREIGN PATENT DOCUMENTS

| | | | |
|---|---|---|---|
| AU | 2014215938 A1 | 9/2014 | |
| CA | 2 707 050 A1 | 6/2009 | |
| CA | 2 841 654 A1 | 8/2015 | |
| CA | 2 944 327 A1 | 10/2015 | |
| DE | 102007016822 A1 | 10/2008 | |
| EP | 0 250 072 A2 | 12/1987 | |
| EP | 0250072 A2 * | 12/1987 | ........... E21B 33/038 |
| EP | 1 619 349 A2 | 1/2006 | |
| EP | 1 772 715 A2 | 4/2007 | |
| EP | 1913228 A2 | 4/2008 | |
| EP | 1961912 A1 | 8/2008 | |
| EP | 1961913 A1 | 8/2008 | |
| EP | 2085566 A2 | 8/2009 | |
| EP | 2 322 357 A1 | 5/2011 | |
| EP | 3032025 A1 | 6/2016 | |
| GB | 1487948 A | 10/1977 | |
| GB | 2 077 812 A | 12/1981 | |
| GB | 2 180 027 A | 3/1987 | |
| GB | 2 228 025 A | 8/1990 | |
| GB | 2 314 391 A | 12/1997 | |
| WO | 2004/079153 A2 | 9/2004 | |
| WO | 2004/101417 A2 | 11/2004 | |
| WO | 2007/001887 A2 | 1/2007 | |
| WO | 2007/070805 A2 | 6/2007 | |
| WO | 2007127737 A2 | 11/2007 | |
| WO | 2008005767 A1 | 1/2008 | |
| WO | WO -2008007970 A1 * | 1/2008 | ........... E21B 17/043 |
| WO | 2009/076648 A2 | 6/2009 | |
| WO | 2012100019 A1 | 7/2012 | |
| WO | 2012/115717 A2 | 8/2012 | |
| WO | 2014056092 A1 | 4/2014 | |
| WO | 2015/000023 A1 | 1/2015 | |
| WO | 2015/119509 A1 | 8/2015 | |
| WO | 2015/127433 A1 | 8/2015 | |
| WO | WO-2015119509 A1 * | 8/2015 | |
| WO | 2015176121 A1 | 11/2015 | |
| WO | 2016160701 A1 | 10/2016 | |
| WO | 2016197255 A1 | 12/2016 | |
| WO | 2017/044384 A1 | 3/2017 | |
| WO | 2017146733 A1 | 8/2017 | |

OTHER PUBLICATIONS

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

Warrior; Move Pipe Better; 500E Electric Top Drive (500 ton-1000 hp); dated May 2015; 4 total pages.

(56) References Cited

OTHER PUBLICATIONS

European Extended Search Report for Application No. 15166062. 8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458. 0-1609; dated Jun. 8, 2017; 7 total pages.
Australian Examination Report for Application No. 2017200371; dated Sep. 19, 2017; 5 total pages.
European Extended Search Report for Application No. 17195552. 9-1614; dated Dec. 4, 2017; 6 total pages.
Australian Examination Report for Application No. 2017200371; dated Feb. 8, 2018; 6 total pages.
Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.
EPO Extended European Search Report dated Jul. 17, 2018, for European Application No. 18158050.7.
A123 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
International Search Report and Written Opinion in PCT/US2018/042812 dated Oct. 17, 2018.
Extended Search Report in application EP18177312.8 dated Nov. 6, 2018.
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Oct. 5, 2018, for European Patent Application No. 18173275.1.
EPO Extended European Search Report dated Nov. 6, 2018, for European Application No. 18159597.6.
European Search Report in related application EP 18198397.4 dated May 14, 2019.
EPO Extended European Search Report dated Jul. 19, 2018, for European Application No. 18159595.0.
Cookson, Colter, "Inventions Speed Drilling, Cut Costs," The American Oil & Gas Reporter, Sep. 2015, 2 pages.
Ennaifer, Amine et al., "Step Change in Well Testing Operations," Oilfield Review, Autumn 2014: 26, No. 3, pp. 32-41.
Balltec Lifting Solutions, LiftLOK™ Brochure, "Highest integrity lifting tools for the harshest environments," 2 pages.
Balltec Lifting Solutions, CoilLOK™ Brochure, "Highest integrity hand-held coiled tubing handling tools," 2 pages.
Peters; Tool Coupler for Use With a Top Drive; U.S. Appl. No. 15/656,508, filed Jul. 21, 2017. (Application not attached to IDS).
Fuehring et al.; Tool Coupler With Rotating Coupling Method for Top Drive; U.S. Appl. No. 15/445,758, filed Feb. 28, 2017. (Application not attached to IDS.).
Bell; Interchangeable Swivel Combined Multicoupler; U.S. Appl. No. 15/607,159, filed May 26, 2017 (Application not attached to IDS.).
Amezaga; Dual Torque Transfer for Top Drive System; U.S. Appl. No. 15/447,881, filed Mar. 2, 2017. (Application not attached to IDS.).
Zouhair; Coupler With Threaded Connection for Pipe Handler; U.S. Appl. No. 15/444,016, filed Feb. 27, 2017. (Application no attached to IDS.).
Liess; Downhole Tool Coupling System; U.S. Appl. No. 15/670,897, filed Aug. 7, 2017. (Application not attached to IDS.).
Muller et al; Combined Multi-Coupler With Rotating Locking Method for Top Drive; U.S. Appl. No. 15/721,216, filed Sep. 29, 2017. (Application not attached to IDS.).
Amezaga et al; Tool Coupler With Threaded Connection for Top Drive; U.S. Appl. No. 15/457,572, filed Mar. 13, 2017. (Application not attached to IDS.).
Wiens; Combined Multi-Coupler With Locking Clamp Connection for Top Drive; U.S. Appl. No. 15/627,428, filed Jun. 19, 2017. (Application not attached to IDS.).
Henke et al.; Tool Coupler With Sliding Coupling Members for Top Drive; U.S. Appl. No. 15/448,297, filed Mar. 2, 2017. (Application not attached to IDS.).
Schoknecht et al.; Combined Multi-Coupler With Rotating Fixations for Top Drive; U.S. Appl. No. 15/447,926, filed Mar. 2, 2017. (Application not attached to IDS.).
Metzlaff et al.; Combined Multi-Coupler for Top Drive; U.S. Appl. No. 15/627,237, filed Jun. 19, 2017. (Application not attached to IDS.).
Liess; Combined Multi-Coupler for Top Drive; U.S. Appl. No. 15/656,914, filed Jul. 21, 2017. (Application not attached to IDS.).
Liess et al.; Combined Multi-Coupler; U.S. Appl. No. 15/656,684, filed Jul. 21, 2017. (Application not attached to IDS).
Amezaga et al.; Tool Coupler With Data and Signal Transfer Methods for Top Drive; U.S. Appl. No. 15/730,305, filed Oct. 11, 2017. (Application not attached to IDS).
Liess; Tool Coupler With Threaded Connection for Top Drive; U.S. Appl. 15/806,560, filed Nov. 8, 2017. (Application not attached to IDS).
European Search Report for Application No. 08 860 261.0-2315; dated Apr. 12, 2011; 4 total pages.
Canadian Office Action for Application No. 2,837,581; dated Aug. 24, 2015; 3 total pages.
PCT Notification of Transmittal of the International Search Report and the Written Opinion of the International Searching Authority for International Application No. PCT/US2016/050542; dated Nov. 25, 2016; 13 total pages.
Canadian Office Action for Application No. 2,955,754; dated Mar. 28, 2018; 3 total pages.

(56) References Cited

OTHER PUBLICATIONS

Canadian Office Action in related application CA 2,955,754 dated Jul. 17, 2018.
Mexican Office Action in related application MX/a/2012281 dated Nov. 20, 2020.

* cited by examiner

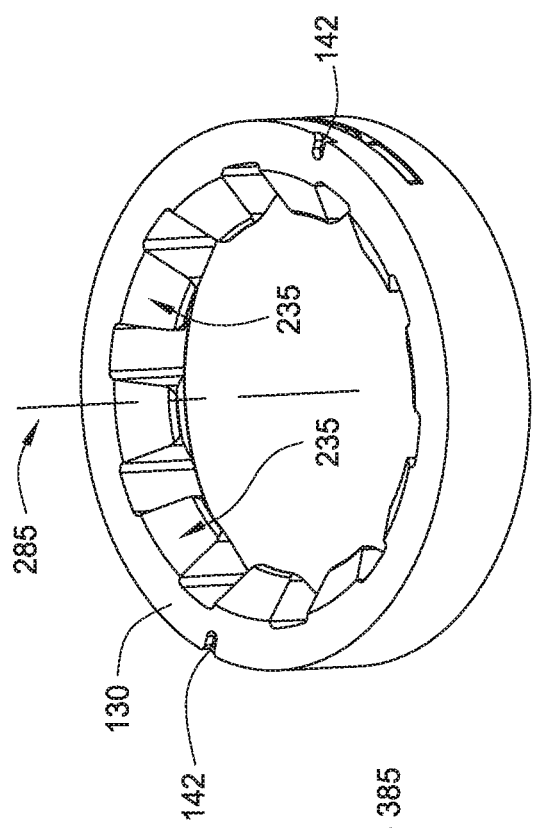
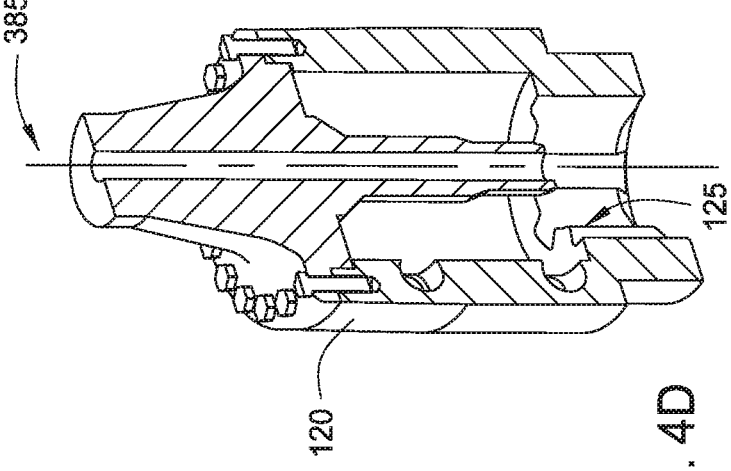
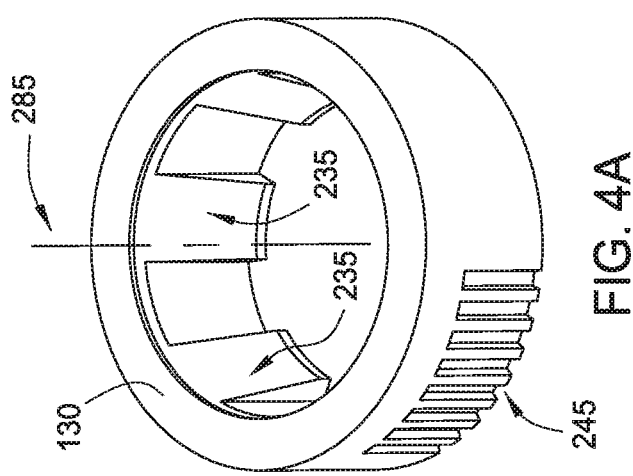
FIG. 4B
FIG. 4D
FIG. 4A

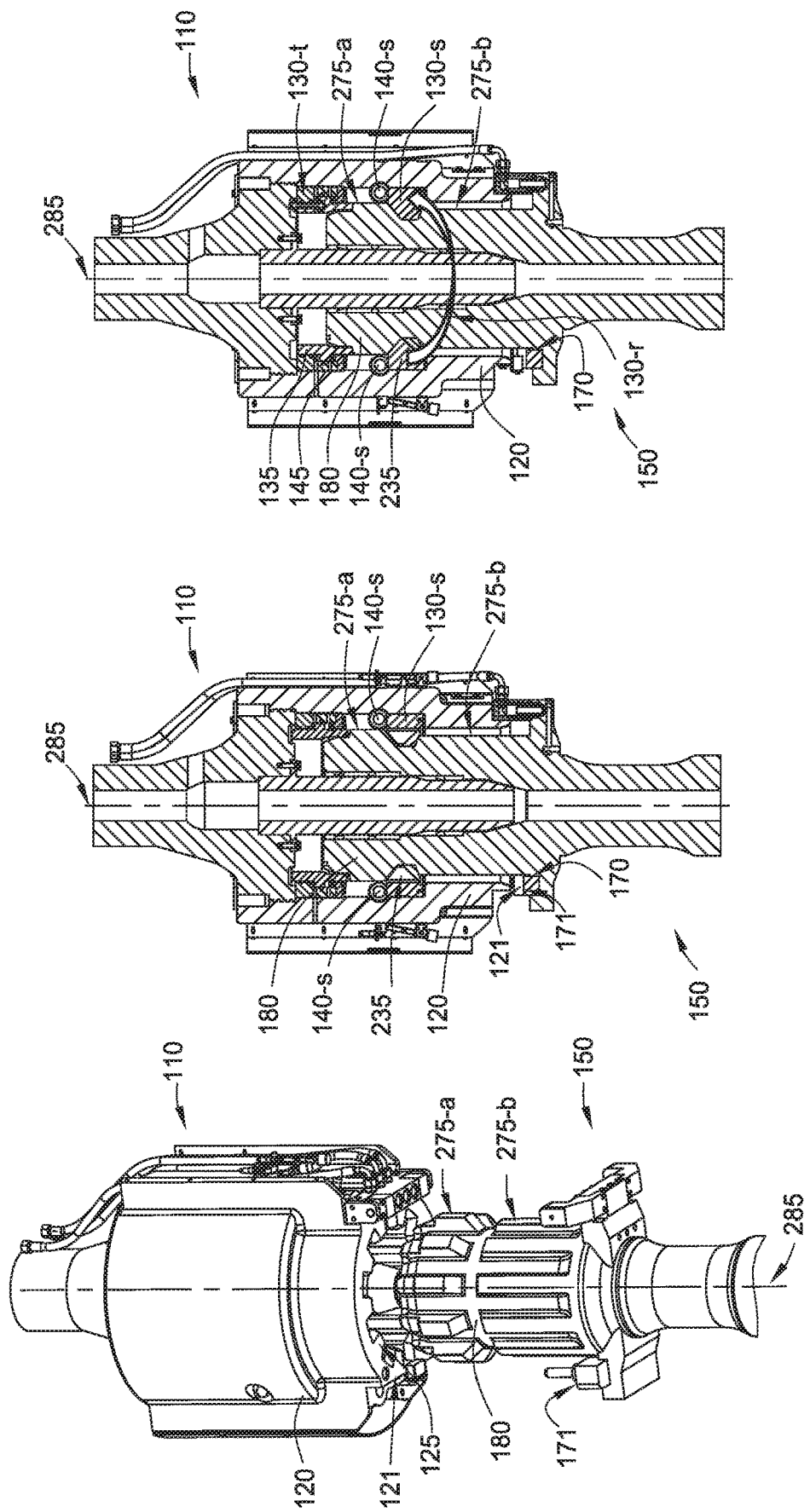

TOOL COUPLER WITH ROTATING COUPLING METHOD FOR TOP DRIVE

BACKGROUND OF THE INVENTION

Embodiments of the present invention generally relate to equipment and methods for coupling a top drive to one or more tools. The coupling may transfer both axial load and torque bi-directionally from the top drive to the one or more tools.

A wellbore is formed to access hydrocarbon-bearing formations (e.g., crude oil and/or natural gas) or for geothermal power generation by the use of drilling. Drilling is accomplished by utilizing a drill bit that is mounted on the end of a tool string. To drill within the wellbore to a predetermined depth, the tool string is often rotated by a top drive on a drilling rig. After drilling to a predetermined depth, the tool string and drill bit are removed, and a string of casing is lowered into the wellbore. Well construction and completion operations may then be conducted.

During drilling and well construction/completion, various tools are used which have to be attached to the top drive. The process of changing tools is very time consuming and dangerous, requiring personnel to work at heights. The attachments between the tools and the top drive typically include mechanical, electrical, optical, hydraulic, and/or pneumatic connections, conveying torque, load, data, signals, and/or power.

Typically, sections of a tool string are connected together with threaded connections. Such threaded connections are capable of transferring load. Right-hand (RH) threaded connections are also capable of transferring RH torque. However, application of left-hand (LH) torque to a tool string with RH threaded connections (and vice versa) risks breaking the string. Methods have been employed to obtain bi-directional torque holding capabilities for connections. Some examples of these bi-directional setting devices include thread locking mechanisms for saver subs, hydraulic locking rings, set screws, jam nuts, lock washers, keys, cross/thru-bolting, lock wires, clutches and thread locking compounds. However, these solutions have shortcomings. For example, many of the methods used to obtain bi-directional torque capabilities are limited by friction between component surfaces or compounds that typically result in a relative low torque resistant connection. Locking rings may provide only limited torque resistance, and it may be difficult to fully monitor any problem due to limited accessibility and location. For applications that require high bi-directional torque capabilities, only positive locking methods such as keys, clutches or cross/through-bolting are typically effective. Further, some high bi-directional torque connections require both turning and milling operations to manufacture, which increase the cost of the connection over just a turning operation required to manufacture a simple male-to-female threaded connection. Some high bi-directional torque connections also require significant additional components as compared to a simple male-to-female threaded connection, which adds to the cost.

Threaded connections also suffer from the risk of cross threading. When the threads are not correctly aligned before torque is applied, cross threading may damage the components. The result may be a weak or unsealed connection, risk of being unable to separate the components, and risk of being unable to re-connect the components once separated. Therefore, threading (length) compensation systems may be used to provide accurate alignment and/or positioning of components having threaded connections prior to application of make-up (or break-out) torque. Conventional threading compensation systems may require unacceptable increase in component length. For example, if a hydraulic cylinder positions a threaded component, providing threading compensation with the cylinder first requires an increase in the cylinder stroke length equal to the length compensation path. Next, the cylinder housing must also be increased by the same amount to accommodate the cylinder stroke in a retracted position. So adding conventional threading compensation to a hydraulic cylinder would require additional component space up to twice the length compensation path length. For existing rigs, where vertical clearance and component weight are important, this can cause problems.

Safer, faster, more reliable, and more efficient connections that are capable of conveying load, data, signals, power and/or bi-directional torque between the tool string and the top drive are needed.

SUMMARY OF THE INVENTION

The present invention generally relates to equipment and methods for coupling a top drive to one or more tools. The coupling may transfer both axial load and torque bi-directionally from the top drive to the one or more tools.

In an embodiment, a tool coupler includes a first component comprising: a ring coupler having mating features and rotatable between a first position and a second position; an actuator functionally connected to the ring coupler to rotate the ring coupler between the first position and the second position; and a second component comprising a profile complementary to the ring coupler.

In an embodiment, a method of coupling a first component to a second component includes inserting a central shaft of the first component into a housing of the second component; rotating a ring coupler around the central shaft; and engaging mating features of the ring coupler with a profile, wherein the profile is on an outside of the central shaft or an inside of the housing.

In an embodiment, a method of coupling a first component to a second component includes inserting a central shaft of the first component into a housing of the second component; rotating a first ring coupler around the central shaft; and clamping a profile using the first ring coupler and a second ring coupler, wherein the profile is on an outside of the central shaft or an inside of the housing.

In an embodiment, a method of coupling a first component to a second component includes inserting a central shaft of the first component into a housing of the second component; rotating a first ring coupler around the central shaft; and moving a second ring coupler vertically relative to the housing to engage a profile, wherein the profile is on an outside of the central shaft or an inside of the housing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4D illustrate example ring couplers for the tool coupler of FIGS. 2A-2B.

FIGS. 8A-8C illustrate another example tool coupler for a top drive system according to embodiments described herein.

DETAILED DESCRIPTION

The present invention provides equipment and methods for coupling a top drive to one or more tools. The top drive may include a control unit, a drive unit, and a tool coupler. The coupling may transfer torque bi-directionally from the top drive through the tool coupler to the one or more tools. The coupling may provide mechanical, electrical, optical, hydraulic, and/or pneumatic connections. The coupling may conveying torque, load, data, signals, and/or power. For example, axial loads of tool strings may be expected to be several hundred tons, up to, including, and sometimes surpassing 750 tons. Required torque transmission may be tens of thousands of foot-pounds, up to, including, and sometimes surpassing 100 thousand foot-pounds. Embodiments disclosed herein may provide axial connection integrity, capable to support high axial loads, good sealability, resistance to bending, high flow rates, and high flow pressures.

Some of the many benefits provided by embodiments of this disclosure include a tool coupler having a simple mechanism that is low maintenance. Benefits also include a reliable method to transfer full bi-directional torque, thereby reducing the risk of accidental breakout of threaded connections along the tool string. In some embodiments, the moving parts of the mechanism may be completely covered. During coupling or decoupling, no turning of exposed parts of the coupler or tool may be required. Coupling and decoupling is not complicated, and the connections may be release by hand as a redundant backup. Embodiments of this disclosure may also provide a fast, hands-free method to connect and transfer power from the top drive to the tools. Embodiments may also provide automatic connection for power and data communications. Embodiments may also provide threading (length) compensation to reduce impact, forces, and/or damage at the threads. Embodiments may provide confirmation of orientation and/or position of the components, for example a stab-in signal. During make-up or break-out, threading compensation may reduce the axial load at the thread and therefore the risk of damage of the thread.

Figure 1:
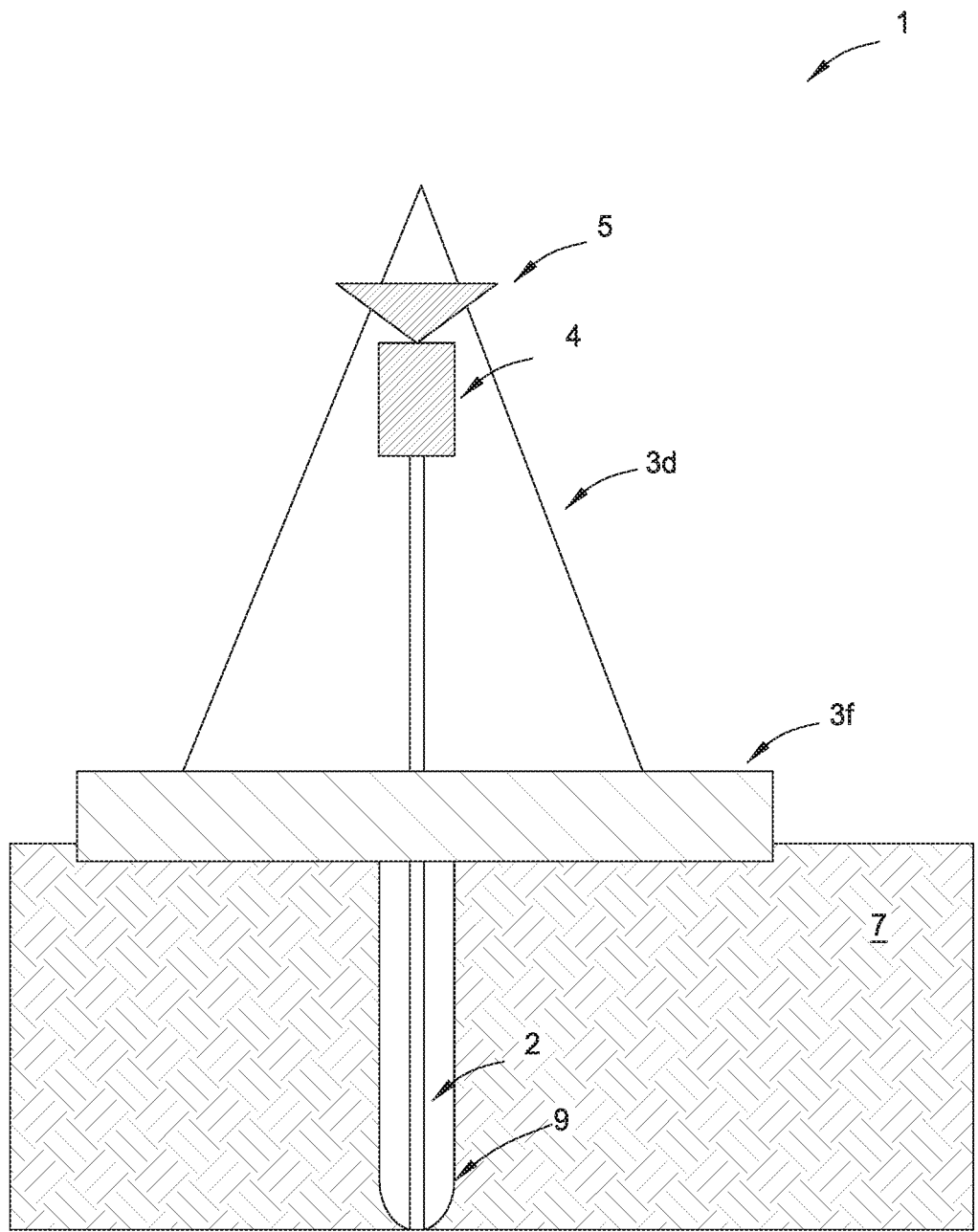
FIG. 1 illustrates a drilling system, according to embodiments of the present disclosure.

FIG. 1 illustrates a drilling system 1, according to embodiments of the present disclosure. The drilling system 1 may include a drilling rig derrick 3d on a drilling rig floor 3f. As illustrated, drilling rig floor 3f is at the surface of a subsurface formation 7, but the drilling system 1 may also be an offshore drilling unit, having a platform or subsea wellhead in place of or in addition to rig floor 3f. The derrick may support a hoist 5, thereby supporting a top drive 4. In some embodiments, the hoist 5 may be connected to the top drive 4 by threaded couplings. The top drive 4 may be connected to a tool string 2. At various times, top drive 4 may support the axial load of tool string 2. In some embodiments, the top drive 4 may be connected to the tool string 2 by threaded couplings. The rig floor 3f may have an opening through which the tool string 2 extends downwardly into a wellbore 9. At various times, rig floor 3f may support the axial load of tool string 2. During operation, top drive 4 may provide torque to tool string 2, for example to operate a drilling bit near the bottom of the wellbore 9. The tool string 2 may include joints of drill pipe connected together, such as by threaded couplings.

At various times, top drive 4 may provide right hand (RH) torque or left hand (LH) torque to tool string 2, for example to make up or break out joints of drill pipe. Power and/or signals may be communicated between top drive 4 and tool string 2. For example, pneumatic, hydraulic, electrical, optical, or other power and/or signals may be communicated between top drive 4 and tool string 2. The top drive 4 may include a control unit, a drive unit, and a tool coupler. In some embodiments, the tool coupler may utilize threaded connections. In some embodiments, the tool coupler may be a combined multi-coupler (CMC) or quick connector to support load and transfer torque with couplings to transfer power (hydraulic, electric, data, and/or pneumatic).

Figure 2A:
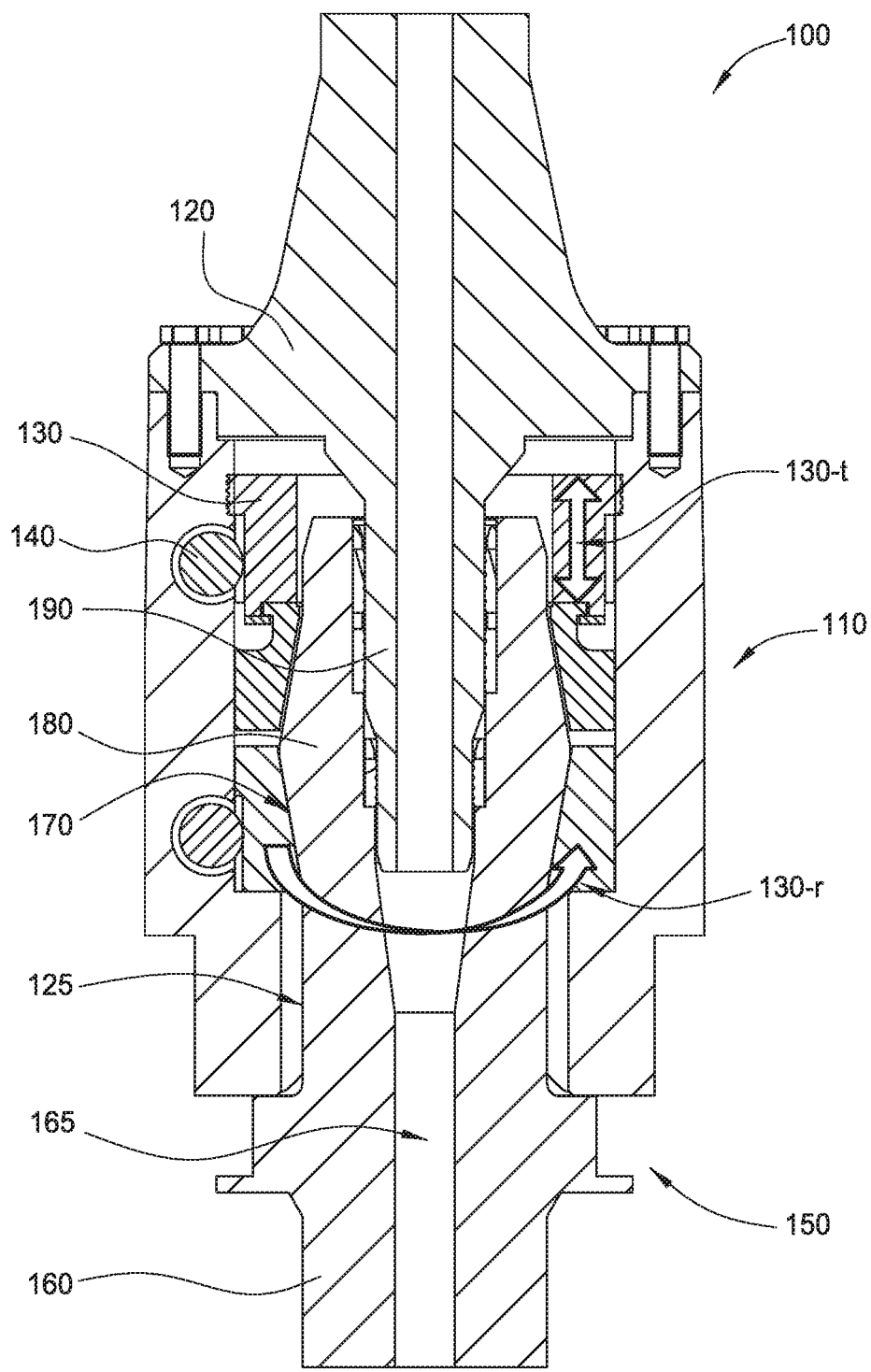
FIGS. 2A-2B illustrate an example tool coupler for a top drive system according to embodiments described herein.

FIG. 2A illustrates a tool coupler 100 for a top drive system (e.g., top drive 4 in FIG. 1) according to embodiments described herein. Generally, tool coupler 100 includes a receiver assembly 110 and a tool adapter 150. The receiver assembly 110 generally includes a housing 120, one or more ring couplers 130, and one or more actuators 140 functionally connected to the ring couplers 130. Optionally, each ring coupler 130 may be a single component forming a complete ring, multiple components connected together to form a complete ring, a single component forming a partial ring, or multiple components connected together to form one or more partial rings. The housing 120 may be connected to a top drive (e.g., top drive 4 in FIG. 1). The actuators 140 may be fixedly connected to the housing 120. In some embodiments, the actuators 140 may be connected with bearings (e.g., a spherical bearing connecting the actuator 140 to the housing, and another spherical bearing connecting the actuator 140 to the ring coupler 130. The ring couplers 130 may be connected to the housing 120 such that the ring couplers 130 may rotate 130-r relative to the housing 120. The ring couplers 130 may be connected to the housing 120 such that the ring couplers 130 may move translationally 130-t (e.g., up or down) relative to the housing 120. The tool adapter 150 generally includes a tool stem 160, a profile 170 that is complementary to the ring couplers 130 of the receiver assembly 110, and a central shaft 180. The tool stem 160 generally remains below the receiver assembly 110. The tool stem 160 connects the tool coupler 100 to the tool string 2. The central shaft 180 generally inserts into the housing 120 of the receiver assembly 110. The housing 120 may include a central stem 190 with an outer diameter less than or equal to an inner diameter of central shaft 180. The central stem 190 and central shaft 180 may share a central bore 165 (e.g. providing fluid communication through the tool coupler 100). In some embodiments, central bore 165 is a sealed mud channel. In some embodiments, central bore 165 provides a fluid connection (e.g., a high pressure fluid connection). The profile 170 may be disposed on the outside of the central shaft 180. The profile 170 may include convex features on the outer surface of central shaft 180. The housing 120 may have mating features 125 that are complementary to profile 170. The housing mating features 125 may be disposed on an interior of the housing 120. The housing mating features 125 may include convex features on an inner surface of the housing 120. When the receiver assembly 110 is coupled to the tool adapter 150, housing mating features 125 may be interleaved with features of profile 170 around central shaft 180. During coupling or decoupling operations, the actuators 140 may cause the ring couplers 130 to rotate 130-r around the central shaft 180, and/or the actuators 140 may cause the ring couplers 130 to move translationally 130-t relative to central shaft 180. Rotation 130-r of the ring coupler 130 may be less than a full turn, less than 180°, or even less than 30°. When the receiver assembly 110 is coupled to the tool adapter 150, tool coupler 100 may transfer torque and/or load between the top drive and the tool.

Figure 2B:
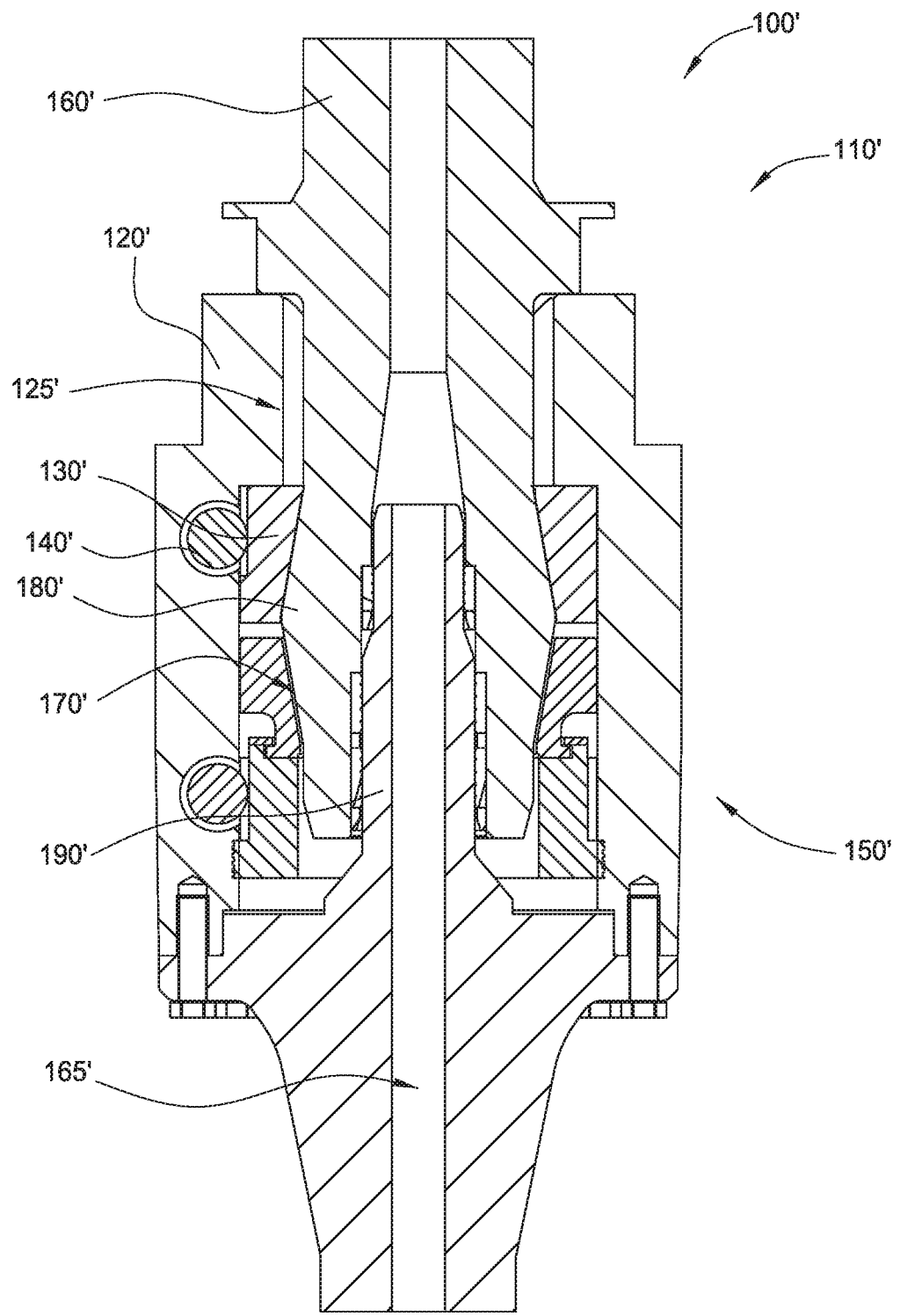

It should be understood that the components of tool couplers described herein could be usefully implemented in reverse configurations. For example, FIG. 2B illustrates a tool coupler 100' having a reverse configuration of components as illustrated in FIG. 2A. Generally, tool coupler 100' includes a receiver assembly 110' and a tool adapter 150'. The tool adapter 150' generally includes a housing 120', one or more ring couplers 130', and one or more actuators 140' functionally connected to the ring couplers 130'. The housing 120' may be connected to the tool string 2. The actuators 140' may be fixedly connected to the housing 120'. The ring couplers 130' may be connected to the housing 120' such that the ring couplers 130' may rotate and/or move translationally relative to the housing 120'. The receiver assembly 110' generally includes a drive stem 160', a profile 170' that is complementary to the ring couplers 130' of the tool adapter 150', and a central shaft 180'. The drive stem 160' generally remains above the tool adapter 150'. The drive stem 160' connects the tool coupler 100 to a top drive (e.g., top drive 4 in FIG. 1). The central shaft 180' generally inserts into the housing 120' of the tool adapter 150'. The housing 120' may include a central stem 190' with an outer diameter less than or equal to an inner diameter of central shaft 180'. The central stem 190' and central shaft 180' may share a central bore 165' (e.g. providing fluid communication through the tool coupler 100'). The profile 170' may be disposed on the outside of the central shaft 180'. The profile 170' may include convex features on the outer surface of central shaft 180'. The housing 120' may have mating features 125' that are complementary to profile 170'. The housing mating features 125' may be disposed on an interior of the housing 120'. The housing mating features 125' may include convex features on an inner surface of the housing 120'. During coupling or decoupling operations, the actuators 140' may cause the ring couplers 130' to rotate and/or to move translationally relative to central shaft 180'. When the receiver assembly 110' is coupled to the tool adapter 150', tool coupler 100' may transfer torque and/or load between the top drive and the tool. Consequently, for each embodiment described herein, it should be understood that the components of the tool couplers could be usefully implemented in reverse configurations.

Figure 3A:
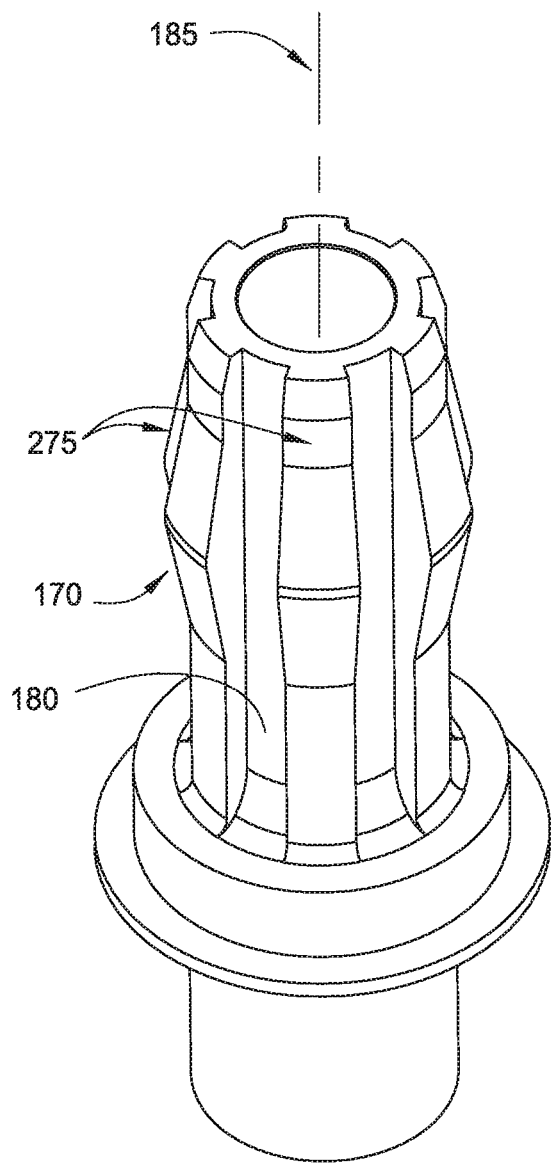
FIGS. 3A-3C illustrate example central shaft profiles for the tool coupler of FIGS. 2A-2B.
Figure 3B:
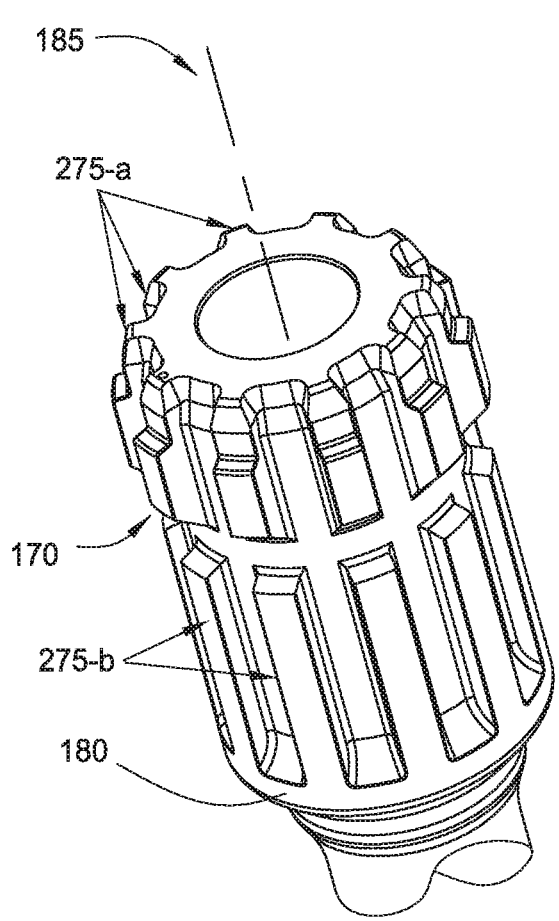
Figure 3C:
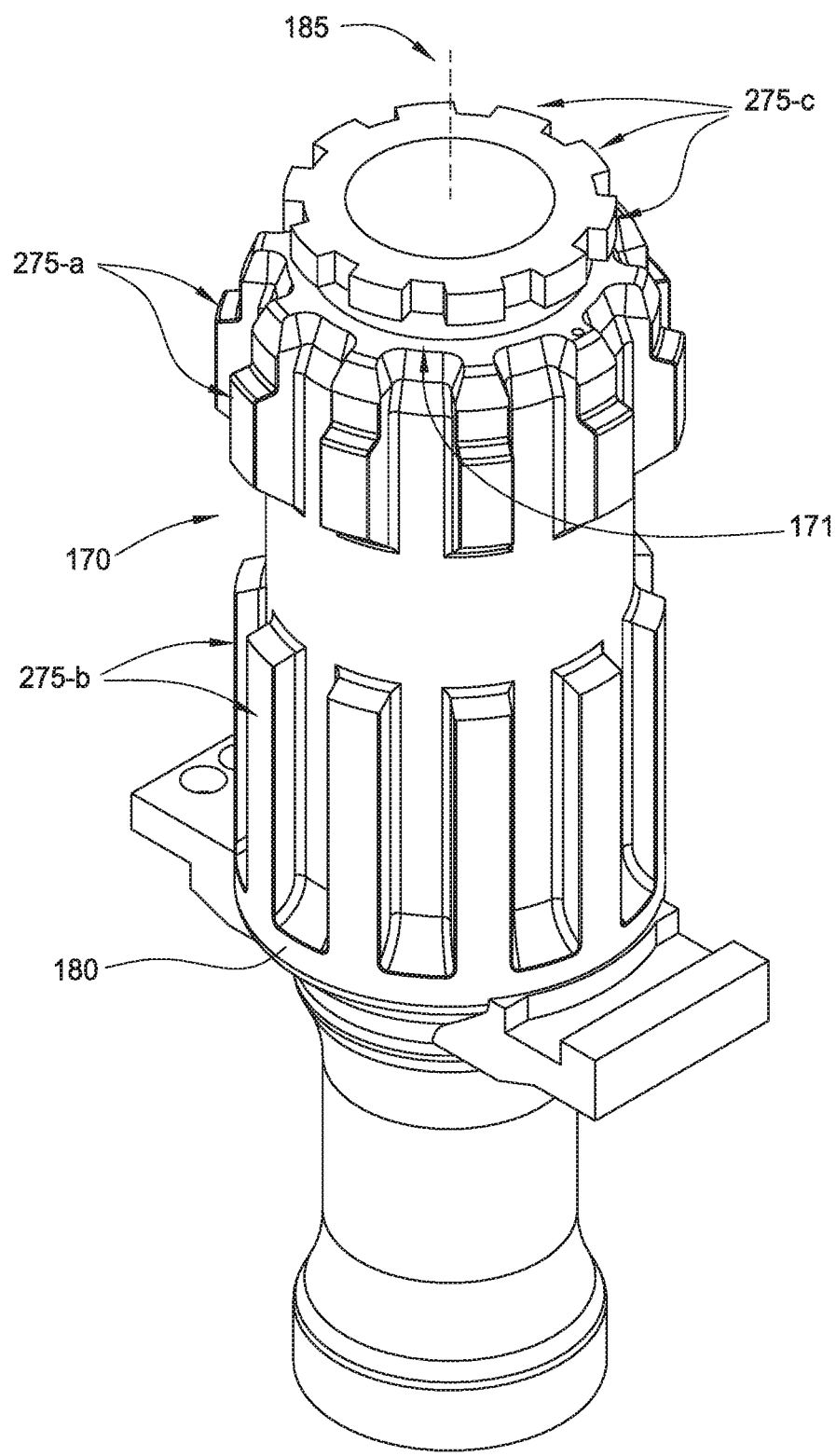

As illustrated in FIG. 3, the profile 170 may include splines 275 distributed on the outside of central shaft 180. The splines 275 may run vertically along central shaft 180. (It should be understood that "vertically", "up", and "down" as used herein refer to the general orientation of top drive 4 as illustrated in FIG. 1. In some instances, the orientation may vary somewhat, in response to various operational conditions. In any instance wherein the central axis of the tool coupler is not aligned precisely with the direction of gravitational force, "vertically", "up", and "down" should be understood to be along the central axis of the tool coupler.) The splines 275 may (as shown) or may not (not shown) be distributed symmetrically about the central axis 185 of the central shaft 180. The width of each spline 275 may (as shown) or may not (not shown) match the width of the other splines 275. The splines 275 may run contiguously along the outside of central shaft 180 (as shown in FIG. 3A). The splines 275 may include two or more discontiguous sets of splines distributed vertically along the outside of central shaft 180 (e.g., splines 275-a and 275-b in FIG. 3B; splines 275-a, 275-b, and 275-c in FIG. 3C). FIG. 3A illustrates six splines 275 distributed about the central axis 185 of the central shaft 180. FIGS. 3B and 3C illustrate ten splines 275 distributed about the central axis 185 of the central shaft 180. It should be appreciated that any number of splines may be considered to accommodate manufacturing and operational conditions. FIG. 3C also illustrates a stop surface 171 to be discussed below.

Figure 4C:
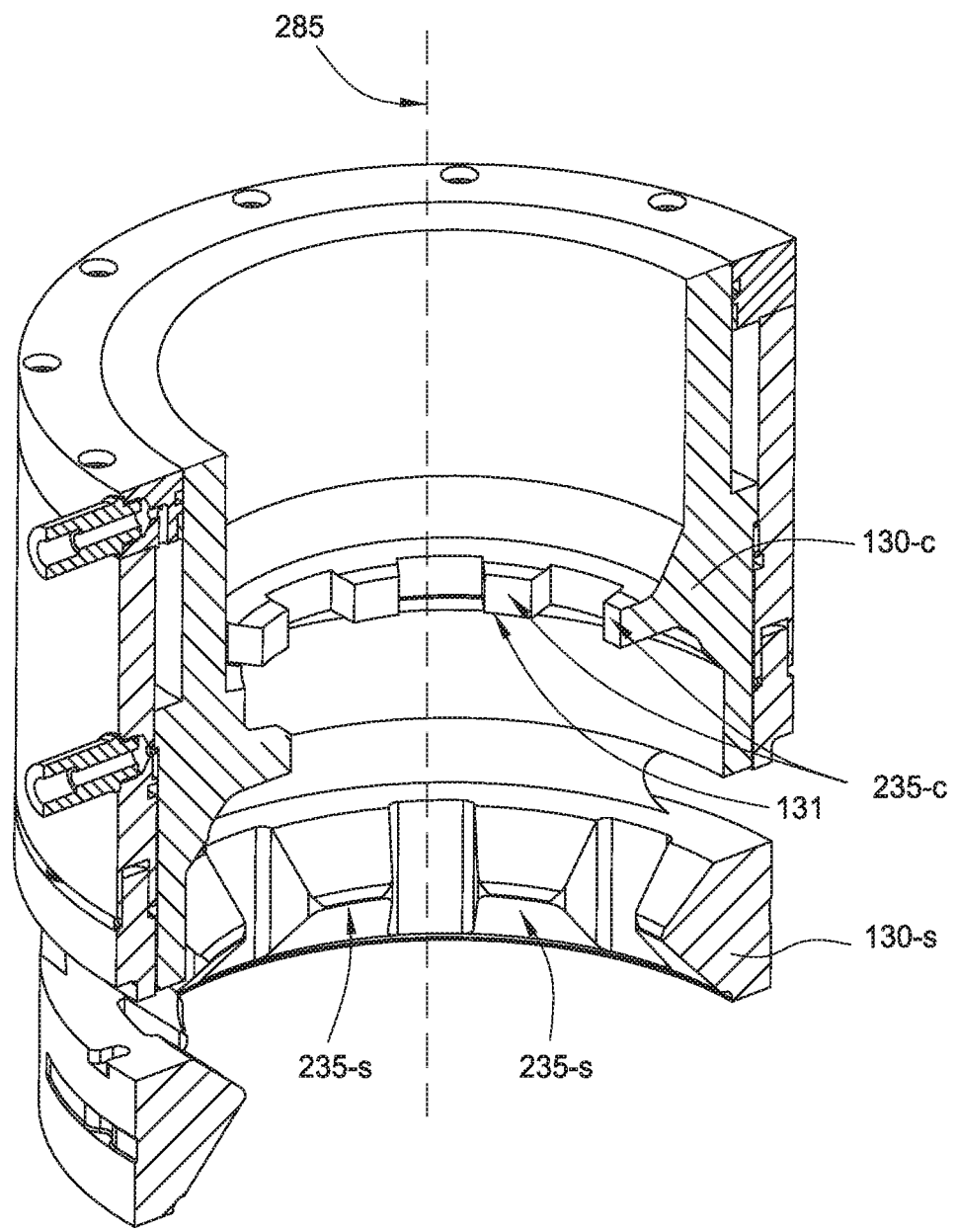

As illustrated in FIG. 4, one or more of the ring couplers 130 may have mating features 235 on an interior thereof. The ring coupler mating features 235 may include convex features on an inner surface of the ring coupler 130. The ring coupler 130 may have cogs 245 distributed on an outside thereof (further discussed below). In some embodiments, the cogs 245 may be near the top of the ring coupler 130 (not shown). The mating features 235 may be complementary with splines 275 from the respective central shaft 180. For example, during coupling or decoupling of receiver assembly 110 and tool adapter 150, the mating features 235 may slide between the splines 275. The mating features 235 may run vertically along the interior of ring coupler 130. The mating features 235 may (as shown) or may not (not shown) be distributed symmetrically about the central axis 285 of the ring coupler 130. The width of each mating feature 235 may (as shown) or may not (not shown) match the width of the other mating features 235. The mating features 235 may run contiguously along the interior of the ring couplers 130 (as shown in FIGS. 4A and 4B). The mating features 235 may include two or more discontiguous sets of mating features distributed vertically along the interior of the ring couplers 130. For example, as shown in FIG. 4C, ring coupler 130-c includes mating features 235-c, while ring coupler 130-s includes mating features 235-s which are below mating features 235-c. In some embodiments, such discontiguous sets of mating features may be rotationally coupled. In the illustrated embodiment, ring coupler 130-c may be fixed to ring coupler 130-s, thereby rotationally coupling mating features 235-c with mating features 235-s. FIG. 4A illustrates six mating features 235 distributed about the central axis 285 of the ring couplers 130. FIGS. 4B and 4C illustrates ten mating features 235 distributed about the central axis 285 of the central shaft 180. It should be appreciated that any number of mating features may be considered to accommodate manufacturing and operational conditions. FIG. 4C also illustrates a stop surface 131 to be discussed below.

Likewise, as illustrated in FIG. 4D, housing 120 may have mating features 125 on an interior thereof. As with the ring coupler mating features 235, the housing mating features 125 may be complementary with splines 275 from the respective central shaft 180. For example, during coupling or decoupling of receiver assembly 110 and tool adapter 150, the mating features 125 may slide between the splines 275. The mating features 125 may run vertically along the interior of housing 120. The housing mating features 125 may be generally located lower on the housing 120 than the operational position of ring couplers 130. The mating features 125 may (as shown) or may not (not shown) be distributed symmetrically about the central axis 385 of the housing 120. The width of each mating feature 125 may (as shown) or may not (not shown) match the width of the other mating features 125. The mating features 125 may run contiguously along the interior of the housing 120 (as shown).

Figure 5A:
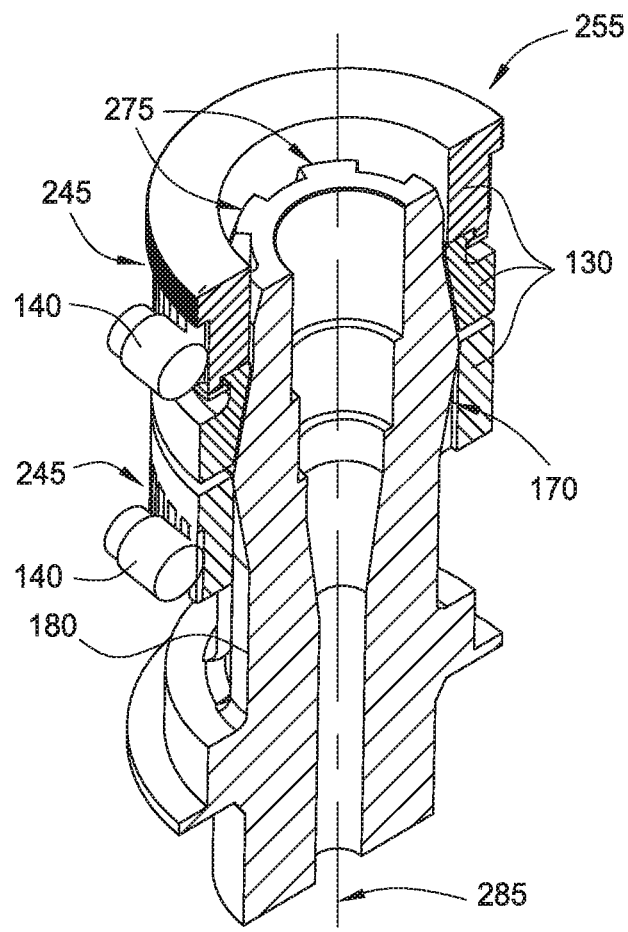
FIGS. 5A-5B illustrate example actuators for the tool coupler of FIGS. 2A-2B.
Figure 5B:
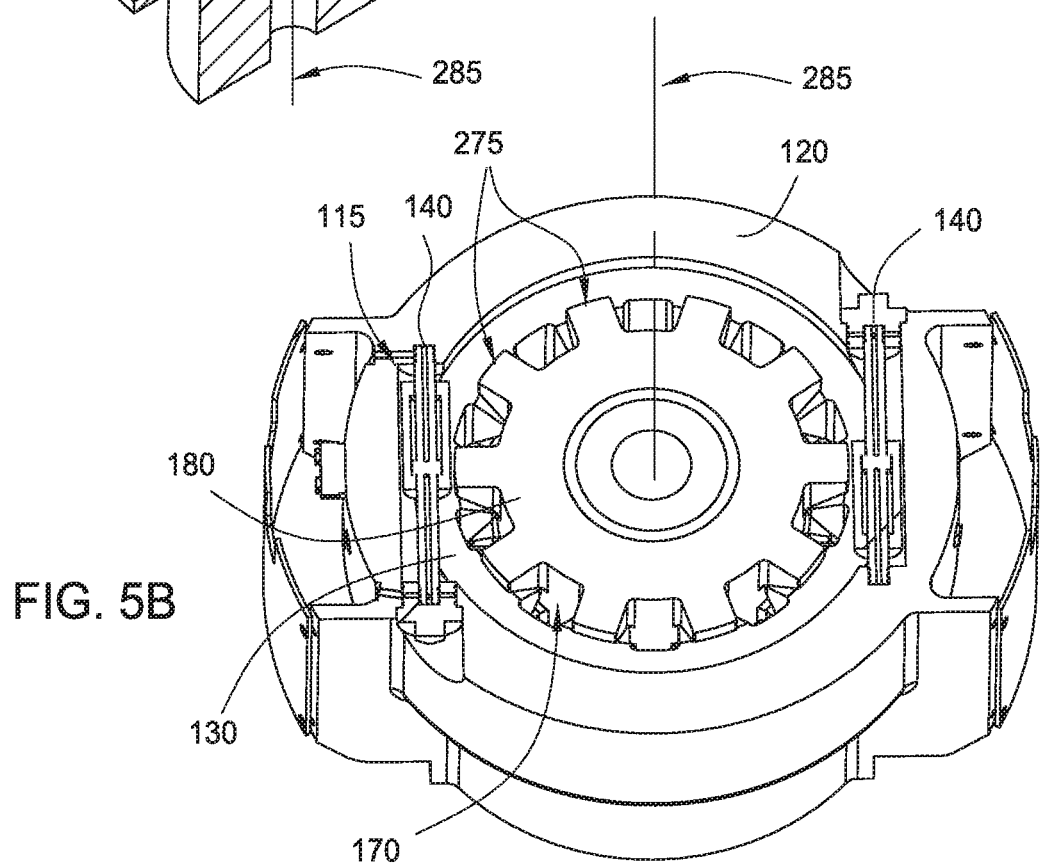
Figure 11A:
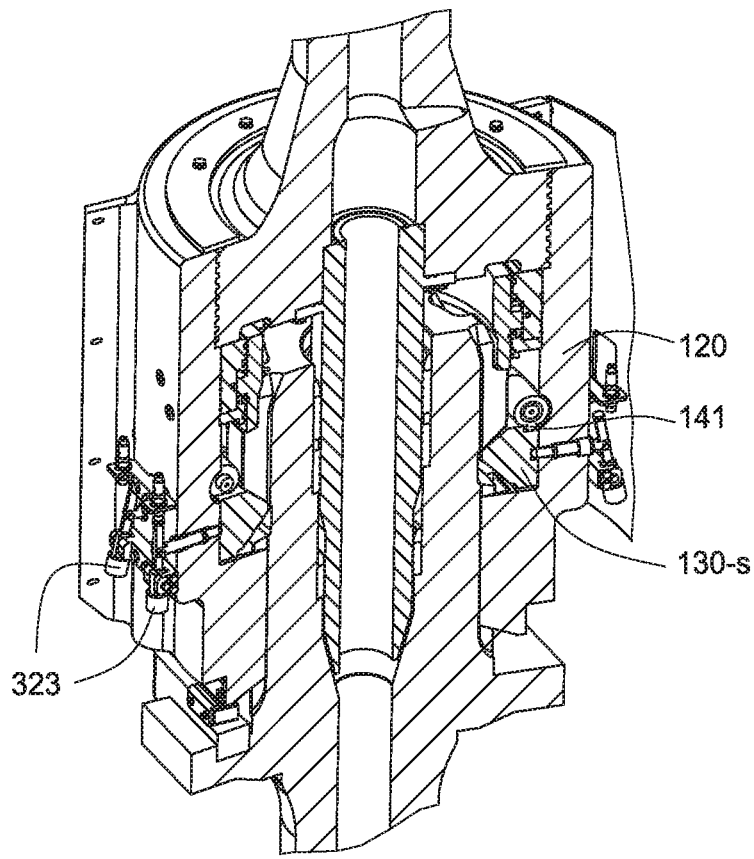
FIGS. 11A-11B illustrate other example sensors for the tool coupler of FIGS. 8A-8C.

As illustrated in FIG. 5, one or more actuators 140 may be functionally connected to ring couplers 130. FIG. 5A illustrates an embodiment having three ring couplers 130 and two actuators 140. FIG. 5B illustrates an embodiment showing one ring coupler 130 and two actuators 140. It should be appreciated that any number of ring couplers and actuators may be considered to accommodate manufacturing and operational conditions. The actuators 140 illustrated in FIG. 5A are worm drives, and the actuators illustrated in FIG. 5B are hydraulic cylinders. Other types of actuators 140 may be envisioned to drive motion of the ring couplers 130 relative to the housing 120. Adjacent to each actuator 140 in FIG. 5A are ring couplers 130 having cogs 245 distributed on an outside thereof (better seen in FIG. 4A). Gearing of the actuators 140 may mesh with the cogs 245. The two actuators 140 in FIG. 5A can thereby independently drive the two adjacent ring couplers 130 to rotate 130-$r$ about central axis 285. The two actuators 140 in FIG. 5B (i.e., the hydraulic cylinders) are both connected to the same ring coupler 130. The hydraulic cylinders are each disposed in cavity 115 in the housing 120 to permit linear actuation by the hydraulic cylinder. The two actuators 140 in FIG. 5B can thereby drive the ring coupler 130 to rotate 130-$r$ about central axis 285. For example, ring coupler 130 shown in FIG. 4B includes pin holes 142 positioned and sized to operationally couple to pins 141 (shown in FIG. 11A) of actuators 140. As illustrated in FIG. 5B, linear motion of the actuators 140 may cause ring coupler 130 to rotate, for example between about 0° and about 18°. Actuators 140 may be hydraulically, electrically, or manually controlled. In some embodiments, multiple control mechanism may be utilized to provide redundancy.

Figure 6A:
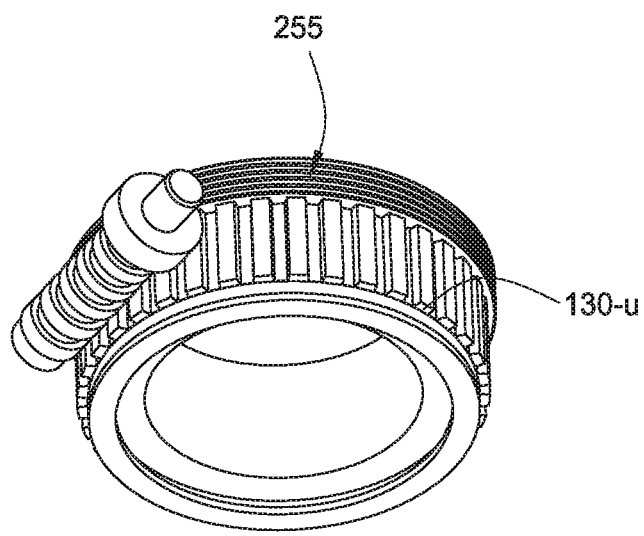
FIGS. 6A-6C illustrate example ring couplers for the tool coupler of FIGS. 2A-2B.
Figure 6B:
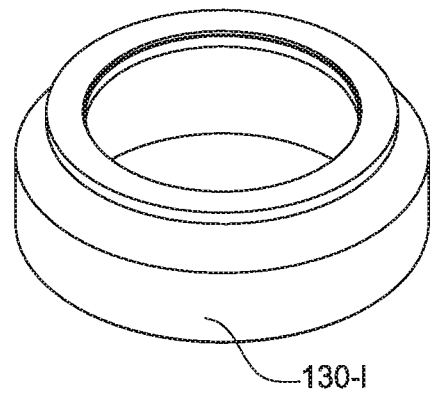
Figure 6C:
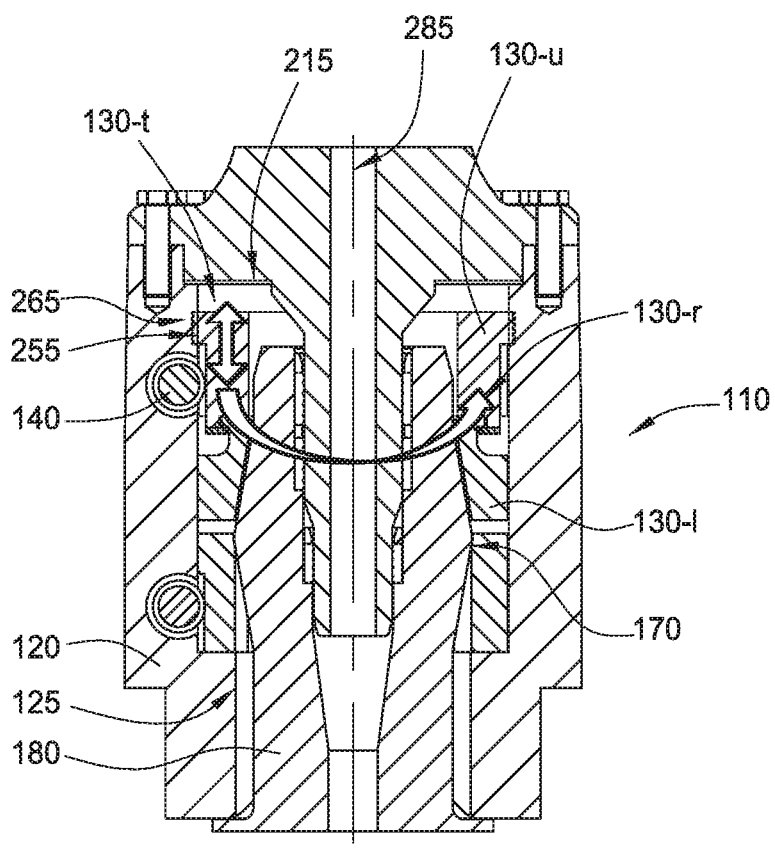

In some embodiments, one or more ring couplers 130 may move translationally 130-$t$ relative to the housing 120. For example, as illustrated in FIG. 6, a ring coupler 130, such as upper ring coupler 130-$u$, may have threading 255 on an outside thereof. The threading 255 may mesh with a linear rack 265 on an interior of housing 120. As upper ring coupler 130-$u$ rotates 130-$r$ about central axis 285, threading 255 and linear rack 265 drive upper ring coupler 130-$u$ to move translationally 130-$t$ relative to housing 120. Housing 120 may have a cavity 215 to allow upper ring coupler 130-$u$ to move translationally 130-$t$. In the illustrated embodiment, upper ring coupler 130-$u$ is connected to lower ring coupler 130-$l$ such that translational motion is transferred between the ring couplers 130. The connection between upper ring coupler 130-$u$ and lower ring coupler 130-$l$ may or may not also transfer rotational motion. In the illustrated embodiment, the actuator 140 may drive upper ring coupler 130-$u$ to rotate 130-$r$ about central axis 285, thereby driving upper ring coupler 130-$u$ to move translationally 130-$t$ relative to housing 120, and thereby driving lower ring coupler 130-$l$ to move translationally 130-$t$ relative to housing 120.

In some embodiments, the lower ring coupler 130-$l$ may be a bushing. In some embodiments, the interior diameter of the lower ring coupler 130-$l$ may be larger at the bottom than at the top. In some embodiments, the lower ring coupler may be a wedge bushing, having an interior diameter that linearly increases from top to bottom.

Figure 7A:
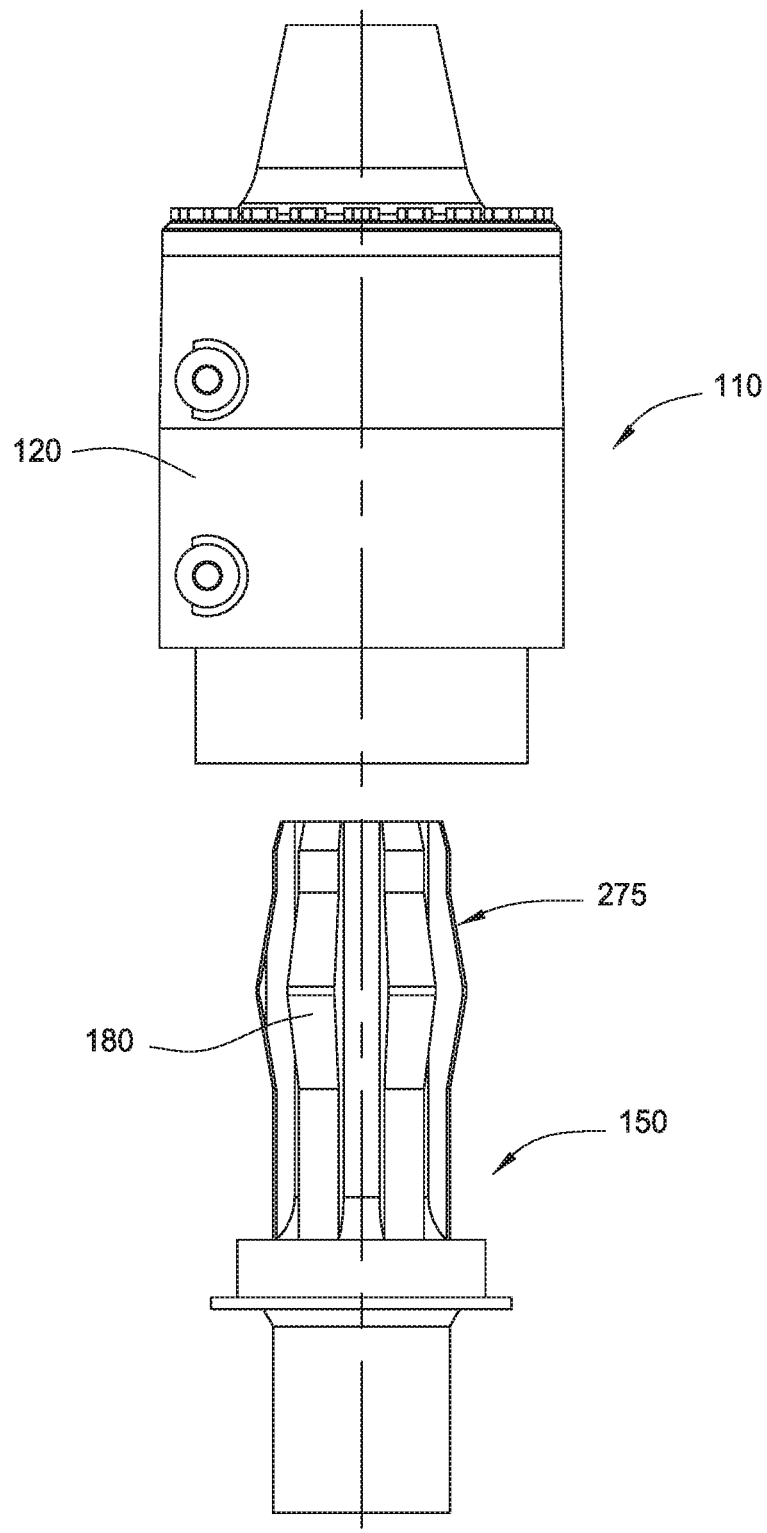
FIGS. 7A-7C illustrate a multi-step process for coupling a receiver assembly to a tool adapter.
Figure 7C:
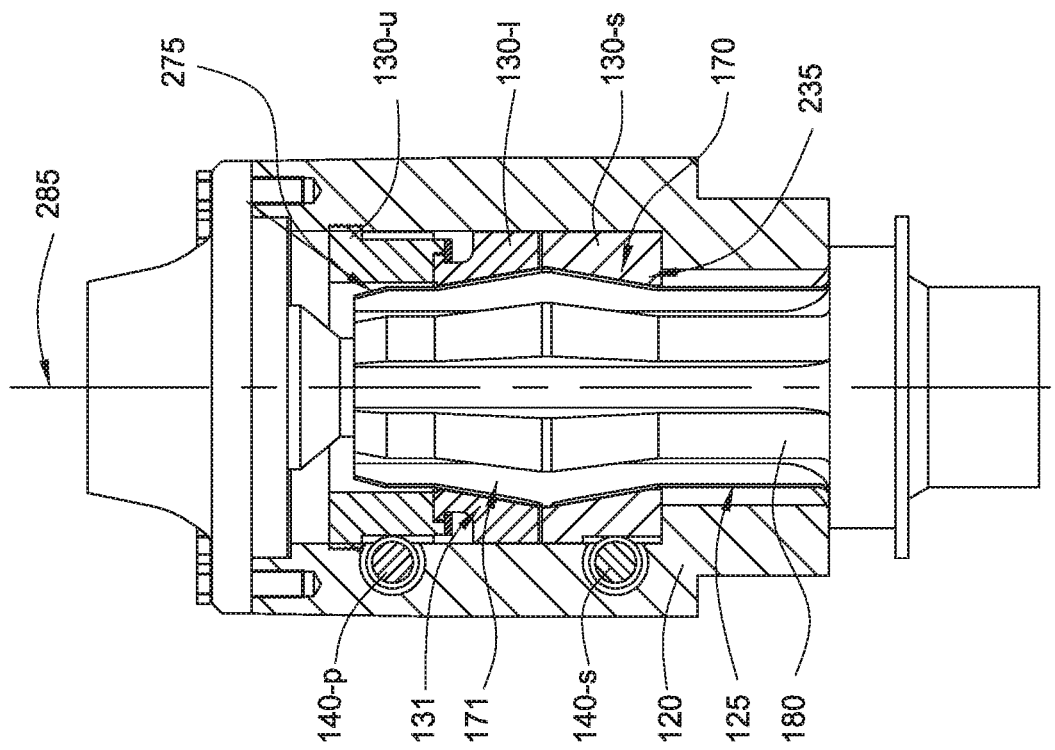
Figure 7B:
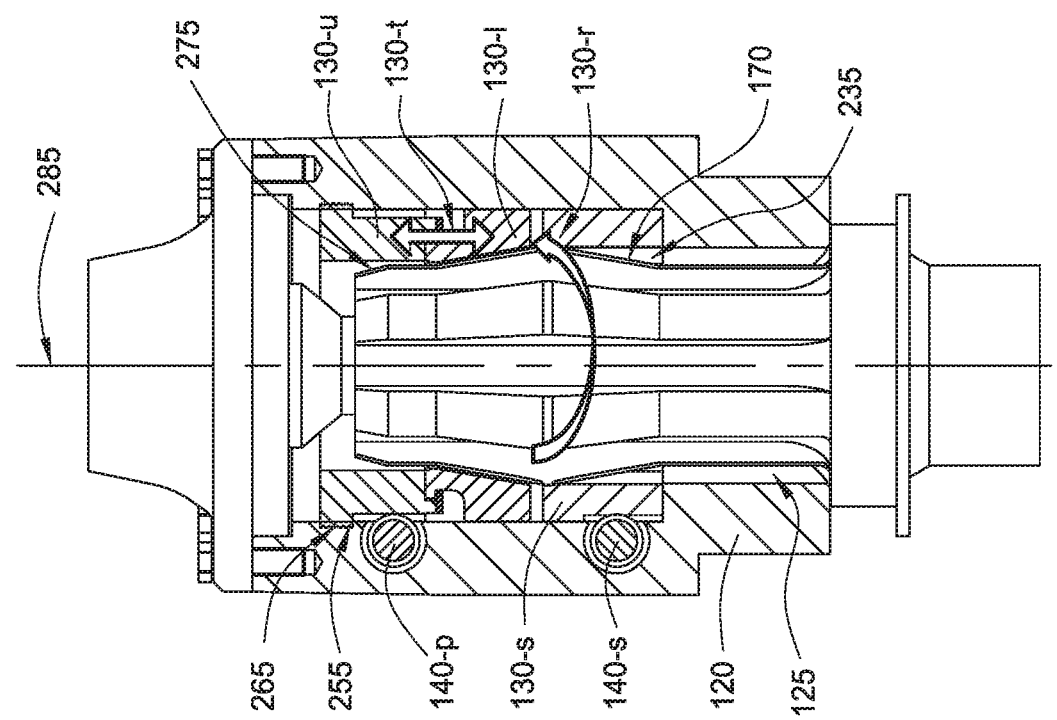

Receiver assembly 110 may be coupled to tool adapter 150 in order to transfer torque and/or load between the top drive and the tool. Coupling may proceed as a multi-step process. In one embodiment, as illustrated in FIG. 7A, coupling begins with inserting central shaft 180 of tool adapter 150 into housing 120 of receiver assembly 110. The tool adapter 150 is oriented so that splines 275 will align with mating features 235 of ring couplers 130 (shown in FIG. 7B) and with mating features 125 of housing 120 (shown in FIG. 7B). For example, during coupling, the ring coupler mating features 235 and the housing mating features 125 may slide between the splines 275. Coupling proceeds in FIG. 7B, as one or more stop surfaces 131 of one or more ring couplers 130 engage complementary stop surfaces 171 of profile 170 of central shaft 180. As illustrated, stop surfaces 131 are disposed on an interior of lower ring coupler 130-$l$. It should be appreciated that other stop surface configurations may be considered to accommodate manufacturing and operational conditions. In some embodiments, position sensors may be used in conjunction with or in lieu of stop surfaces to identify when insertion of central shaft 180 into housing 120 has completed. Likewise, optical guides may be utilized to identify or confirm when insertion of central shaft 180 into housing 120 has completed. Coupling proceeds in FIG. 7C as the profile 170 is clamped by ring couplers 130. For example, support actuator 140-$s$ may be actuated to drive support ring coupler 130-$s$ to rotate 130-$r$ about central axis 285. Rotation 130-$r$ of the support ring coupler 130-$s$ may be less than a full turn, less than 180°, or even less than 30°. Ring coupler mating features 235 may thereby rotate around profile 170 to engage splines 275. Pressure actuator 140-$p$ may be actuated to drive upper ring coupler 130-$u$ to rotate 130-$r$ about central axis 285. For example, pressure actuator 140-$p$ may include worm gears. Rotation 130-$r$ of the upper ring coupler 130-$u$ may be less than or more than a full turn. Threading 255 and linear rack 265 may thereby drive upper ring coupler 130-$u$ to move translationally 130-$t$ downward relative to housing 120, thereby driving lower ring coupler 130-$l$ to move downwards. Profile 170 of central shaft 180 may thus be clamped by lower ring coupler 130-$l$ and support ring coupler 130-$s$. Mating features 125 of housing 120 may mesh with and engage splines 275. Torque and/or load may thereby be transferred between the top drive and the tool.

In some embodiments, pressure actuator 140-$p$ may be actuated to drive upper ring coupler 130-$u$ to rotate 130-$r$ about central axis 285, and thereby to drive lower ring coupler 130-$l$ to move translationally 130-$t$ in order to preload the tool stem 160.

FIG. 8 provides another example of receiver assembly 110 coupling to tool adapter 150 in order to transfer torque and/or load between the top drive and the tool. In one embodiment, as illustrated in FIG. 8A, coupling begins with inserting central shaft 180 of tool adapter 150 into housing 120 of receiver assembly 110. The tool adapter 150 is oriented so that splines 275 will align with mating features 235 of ring couplers 130 (shown in FIGS. 4B and 8B) and with mating features 125 of housing 120 (shown in FIGS. 4D and 8A). For example, during coupling, the ring coupler mating features 235 and the housing mating features 125 may slide between the splines 275 (e.g., load splines 275-$a$, torque splines 275-$b$). Coupling proceeds in FIG. 8B, as one or more stop surfaces 121 of housing 120 engage complementary stop surfaces 171 of profile 170 of central shaft 180. It should be appreciated that other stop surface configurations may be considered to accommodate manufacturing and/or operational conditions. In some embodiments, position sensors may be used in conjunction with or in lieu of stop surfaces to identify when insertion of central shaft 180 into housing 120 has completed. Likewise, optical guides may be utilized to identify or confirm when insertion of central shaft 180 into housing 120 has completed. Coupling proceeds in FIG. 8C as the profile 170 is engaged by ring couplers 130. For example, support actuators 140-s may be actuated to drive support ring coupler 130-s to rotate 130-r about central axis 285. Ring coupler mating features 235 may thereby rotate around profile 170 to engage load splines 275-a. It should be understood that, while support ring coupler 130-s is rotating 130-r about central axis 285, the weight of tool string 2 may not yet be transferred to tool adapter 150. Engagement of ring coupler mating features 235 with load splines 275-a may include being disposed in close proximity and/or making at least partial contact. Mating features 125 of housing 120 may then mesh with and/or engage torque splines 275-b. Torque and/or load may thereby be transferred between the top drive and the tool.

In some embodiments, receiver assembly 110 may include a clamp 135 and clamp actuator 145. For example, as illustrated in FIG. 8C, clamp 135 may be an annular clamp, and clamp actuator 145 may be a hydraulic cylinder. Clamp 135 may move translationally 135-t relative to the housing 120. Clamp actuator 145 may drive clamp 135 to move translationally 135-t downward relative to housing 120. Load splines 275-a of profile 170 may thus be clamped by clamp 135 and support ring coupler 130-s. In some embodiments, clamp actuator 145 may be actuated to drive clamp 135 to move translationally 135-t in order to preload the tool stem 160.

In some embodiments, tool coupler 100 may provide length compensation for longitudinal positioning of tool stem 160. It may be beneficial to adjust the longitudinal position of tool stem 160, for example, to provide for threading of piping on tool string 2. Such length compensation may benefit from greater control of longitudinal positioning, motion, and/or torque than is typically available during drilling or completion operations. As illustrated in FIG. 9, a compensation ring coupler 130-c may be configured to provide length compensation of tool stem 160 after load coupling of tool adapter 150 and receiver assembly 110.

Figure 9A:
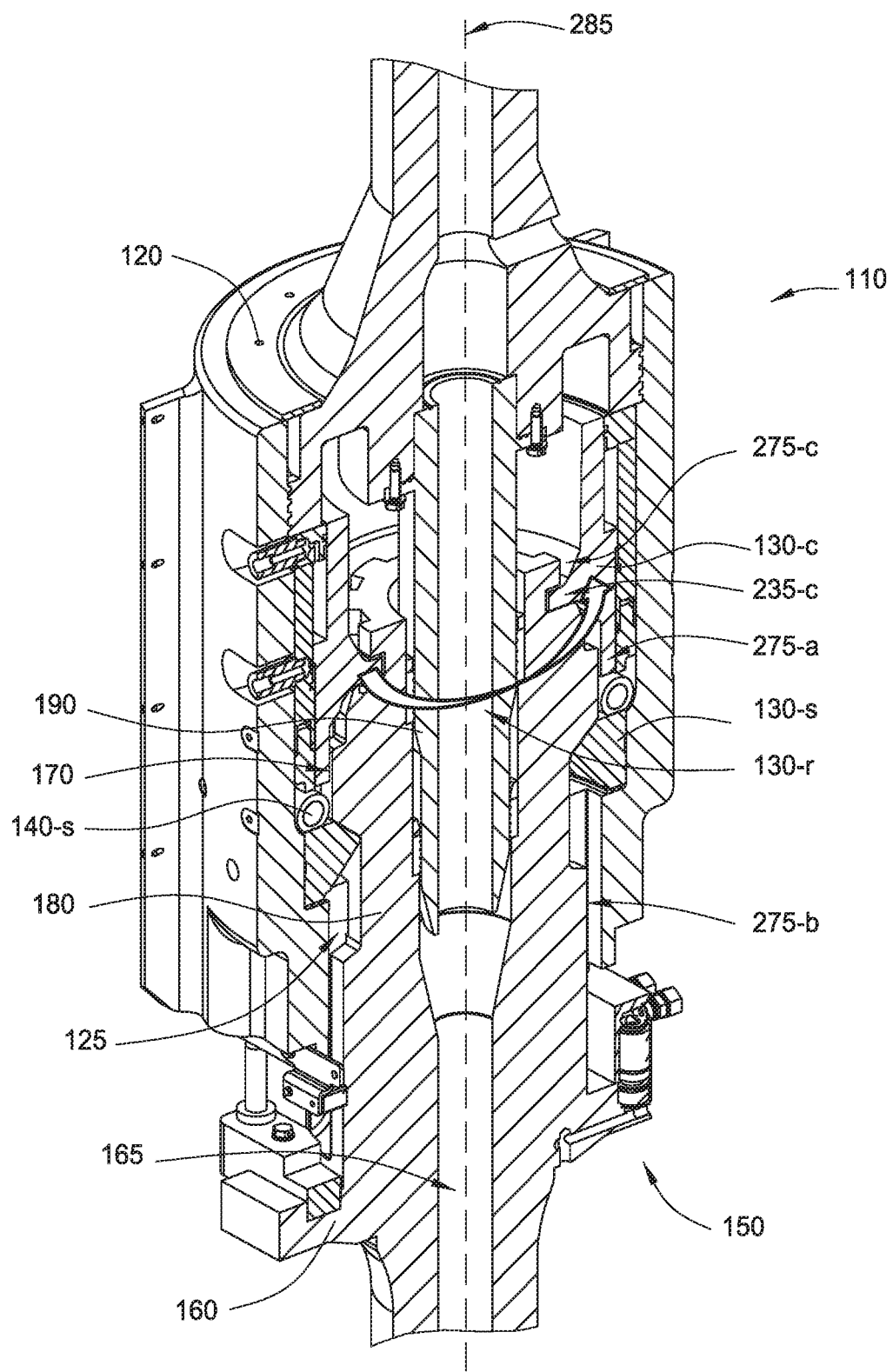
FIGS. 9A-9B illustrate example ring couplers for the tool coupler of FIGS. 2A-8A-8C.

Similar to support ring coupler 130-s, compensation ring coupler 130-c may rotate 130-r about central axis 285 to engage profile 170 of central shaft 180. For example, as illustrated in FIG. 9A, compensation ring coupler 130-c may rotate 130-r to engage compensation splines 275-c with ring coupler mating features 235-c. It should be understood that, while compensation ring coupler 130-c is rotating 130-r about central axis 285, the weight of tool string 2 may not yet be transferred to tool adapter 150. Engagement of ring coupler mating features 235-c with compensation splines 275-c may include being disposed in close proximity and/or making at least partial contact. In some embodiments, compensation ring coupler 130-c may be rotationally fixed to support ring coupler 130-s, so that support actuators 140-s may be actuated to drive support ring coupler 130-s and compensation ring coupler 130-c to simultaneously rotate 130-r about central axis 285.

Figure 9B:
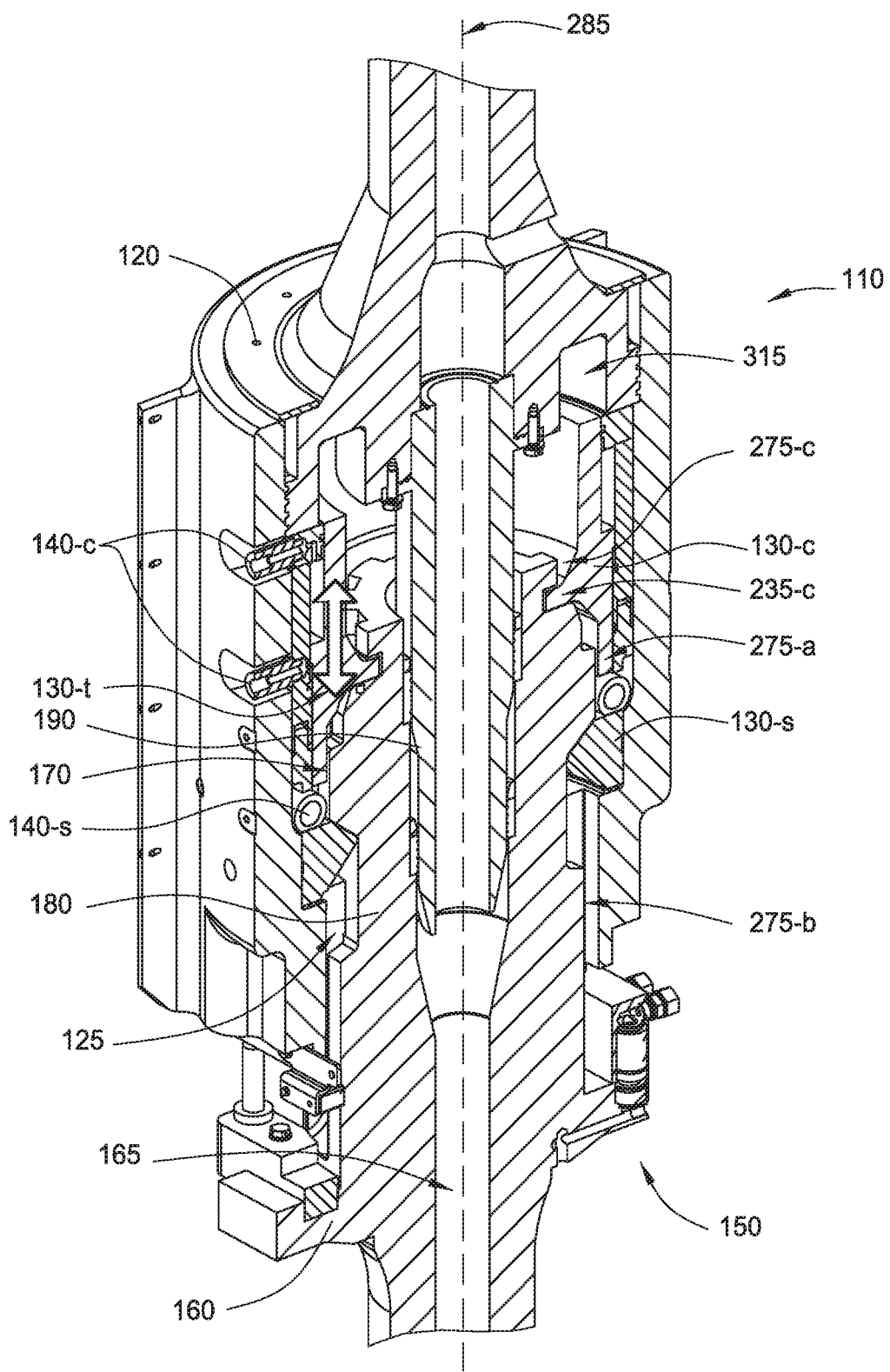

Similar to clamp 135, compensation ring coupler 130-c may move translationally 135-t relative to the housing 120. For example, as illustrated in FIG. 9B, compensation actuators 140-c may drive compensation ring coupler 130-c to move translationally 135-t relative to housing 120. More specifically, compensation actuators 140-c may drive compensation ring coupler 130-c to move translationally 135-t downward relative to housing 120, and thereby load splines 275-a of profile 170 may be clamped by compensation ring coupler 130-c and support ring coupler 130-s. In some embodiments, compensation actuators 140-c may be actuated to apply vertical force on compensation ring coupler 130-c. In some embodiments, compensation actuators 140-c may be one or more hydraulic cylinders. Actuation of the upper compensation actuator 140-c may apply a downward force and/or drive compensation ring coupler 130-c to move translationally 130-t downwards relative to housing 120 and/or support ring coupler 130-s, and thereby preload the tool stem 160. When compensation ring coupler 130-c moves downwards, mating features 235-c may push downwards on load splines 275-a. Actuation of the lower compensation actuator 140-c may apply an upward force and/or drive compensation ring coupler 130-c to move translationally 130-t upwards relative to housing 120 and/or support ring coupler 130-s, and thereby provide length compensation for tool stem 160. When compensation ring coupler 130-c moves upwards, mating features 235-c may push upwards on compensation splines 275-c. Compensation actuators 140-c may thereby cause compensation ring coupler 130-c to move translationally 130-t relative to housing 120 and/or support ring coupler 130-s. Housing 120 may have a cavity 315 to allow compensation ring coupler 130-c to move translationally 130-t. In some embodiments, compensation ring coupler 130-c may move translationally 130-t several hundred millimeters, for example, 120 mm. In some embodiments, a compensation actuator may be functionally connected to support ring coupler 130-s to provide an upward force in addition to or in lieu of a compensation actuator 140-c applying an upward force on compensation ring coupler 130-c.

Figure 10A:
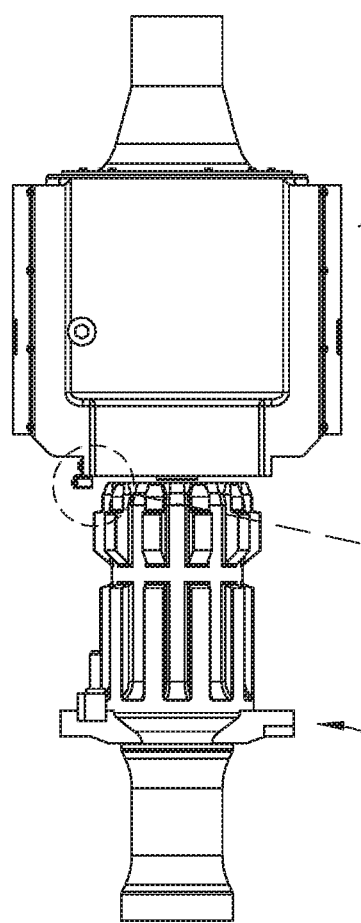
FIGS. 10A-10B illustrate example sensors for the tool coupler of FIGS. 8A-8C.
Figure 10B:
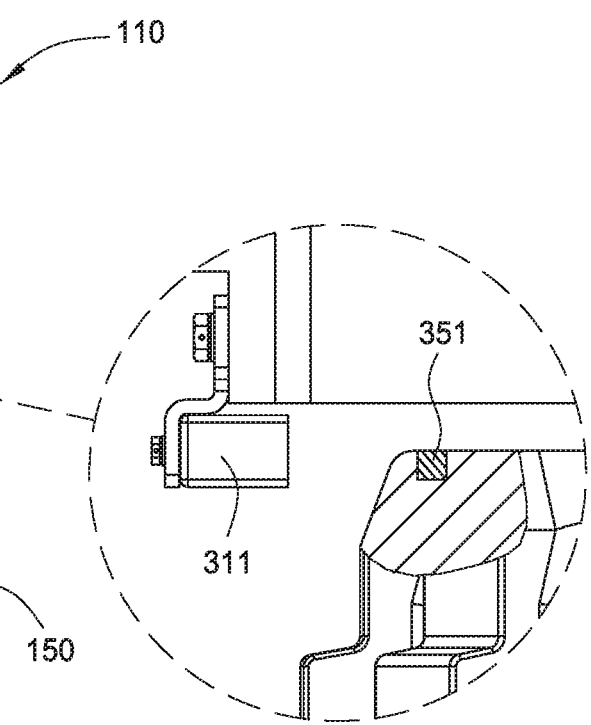

One or more sensors may be used to monitor relative positions of the components of the tool coupler 100. For example, as illustrated in FIG. 10, sensors may be used to identify or confirm relative alignment or orientation of receiver assembly 110 and tool adapter 150. In an embodiment, a detector 311 (e.g., a magnetic field detector) may be attached to receiver assembly 110, and a marker 351 (e.g., a magnet) may be attached to tool adapter 150. Prior to insertion, tool adapter 150 may be rotated relative to receiver assembly 110 until the detector 311 detects marker 351, thereby confirming appropriate orientation. It should be appreciated that a variety of orienting sensor types may be considered to accommodate manufacturing and operational conditions.

Figure 11B:
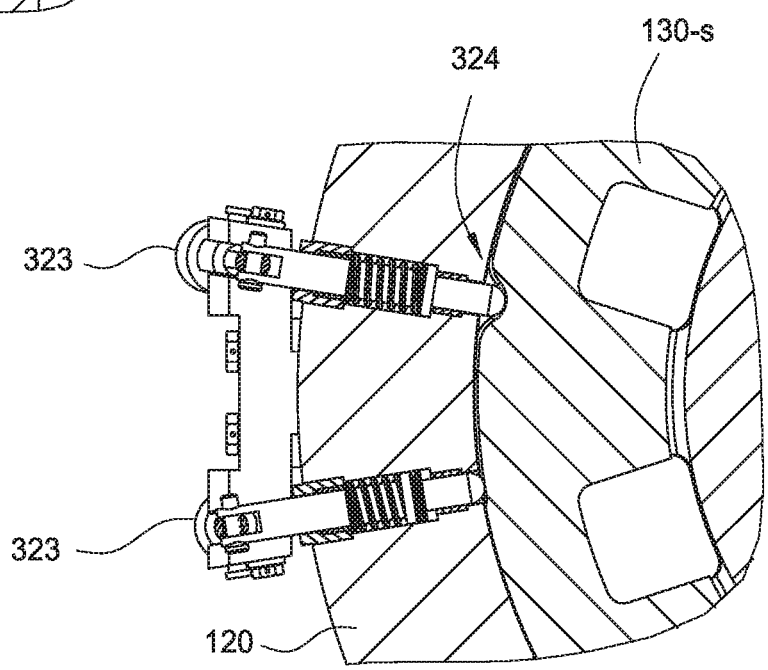

As another example, sensors may monitor the position of the ring couplers 130 relative to other components of the tool coupler 100. For example, as illustrated in FIG. 11, external indicators 323 may monitor and/or provide indication of the orientation of support ring coupler 130-s. The illustrated embodiment shows rocker pins 323 positioned externally to housing 120. The rocker pins 323 are configured to engage with one or more indentions 324 on support ring coupler 130-s. By appropriately locating the indentions 324 and the rocker pins 323, the orientation of support ring coupler 130-s relative to housing 120 may be visually determined. Such an embodiment may provide specific indication regarding whether support ring coupler 130-s is oriented appropriately for receiving the load of the tool string 2 (i.e., whether the ring coupler mating features 235 are oriented to engage the load splines 275-a). The load of the tool string 2 may be supported until, at least, the ring coupler mating features 235 on the support ring coupler 130-*s* have engaged the splines 275/275-*a*. For example, a spider may longitudinally supporting the tool string 2 from the rig floor 3*f* until the ring coupler mating features 235 on the support ring coupler 130-*s* have engaged the splines 275/275-*a*. Likewise, during decoupling, the load of the tool string 2 may be supported prior to disengagement of the mating features 235 on the support ring coupler 130-*s* with the splines 275/275-*a*.

Figure 12:
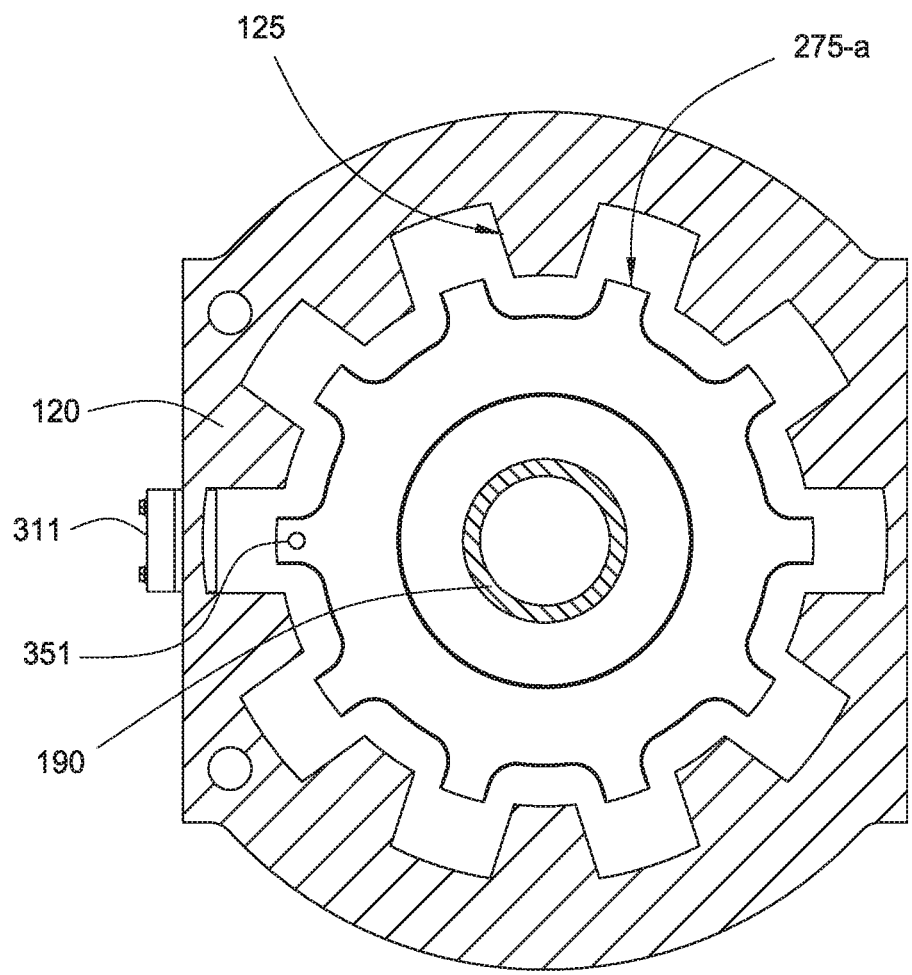
FIG. 12 illustrates example components for the tool coupler of FIGS. 8A-8C.

The relative sizes of the various components of tool coupler 100 may be selected for coupling/decoupling efficiency, load transfer efficiency, and/or torque transfer efficiency. For example, as illustrated in FIG. 12, for a housing 120 having an outer diameter of between about 36 inches and about 40 inches, a clearance of 20 mm may be provided in all directions between the top of load splines 275-*a* and the bottom of housing mating features 125. Such relative sizing may allow for more efficient coupling in the event of initial translational misalignment between the tool adapter 150 and the receiver assembly 110. It should be understood that, once torque coupling is complete, the main body of torque splines 275-*b* and housing mating features 125 may only have a clearance on the order of 1 mm in all directions (e.g., as illustrated in FIG. 8C).

In some embodiments, guide elements may assist in aligning and/or orienting tool adapter 150 during coupling with receiver assembly 110. For example, one or more chamfer may be disposed at a lower-interior location on housing 120. One or more ridges and/or grooves may be disposed on central stem 190 to mesh with complementary grooves and/or ridges on central shaft 180. One or more pins may be disposed on tool adapter 150 to stab into holes on housing 120 to confirm and/or lock the orientation of the tool adapter 150 with the receiver assembly 110. In some embodiments, such pins/holes may provide stop surfaces to confirm complete insertion of tool adapter 150 into receiver assembly 110.

Optionally, seals, such as O-rings, may be disposed on central stem 190. The seals may be configured to be engaged only when the tool adapter 150 is fully aligned with the receiver assembly 110.

Optionally, a locking mechanism may be used that remains locked while the tool coupler 100 conveys axial load. Decoupling may only occur when tool coupler 100 is not carrying load. For example, actuators 140 may be self-locking (e.g., electronic interlock or hydraulic interlock). Alternatively, a locking pin may be used.

It should be appreciated that, for tool coupler 100, a variety of configurations, sensors, actuators, and/or adapters types and/or configurations may be considered to accommodate manufacturing and operational conditions. For example, although the illustrated embodiments show a configuration wherein the ring couplers are attached to the receiver assembly, reverse configurations are envisioned (e.g., wherein the ring couplers are attached to the tool adapter). Possible actuators include, for example, worm drives, hydraulic cylinders, compensation cylinders, etc. The actuators may be hydraulically, pneumatically, electrically, and/or manually controlled. In some embodiments, multiple control mechanism may be utilized to provide redundancy. One or more sensors may be used to monitor relative positions of the components of the top drive system. The sensors may be position sensors, rotation sensors, pressure sensors, optical sensors, magnetic sensors, etc. In some embodiments, stop surfaces may be used in conjunction with or in lieu of sensors to identify when components are appropriately positioned and/or oriented. Likewise, optical guides may be utilized to identify or confirm when components are appropriately positioned and/or oriented. In some embodiments, guide elements (e.g., pins and holes, chamfers, etc.) may assist in aligning and/or orienting the components of tool coupler 100. Bearings and seals may be disposed between components to provide support, cushioning, rotational freedom, and/or fluid management.

In an embodiment, a tool coupler includes a first component comprising: a ring coupler having mating features and rotatable between a first position and a second position; an actuator functionally connected to the ring coupler to rotate the ring coupler between the first position and the second position; and a second component comprising a profile complementary to the ring coupler.

In one or more embodiments disclosed herein, with the ring coupler in the first position, the mating features do not engage the profile; and with the ring coupler in the second position, the mating features engage the profile to couple the first component to the second component.

In one or more embodiments disclosed herein, the first component comprises a housing, the second component comprises a central shaft, and the profile is disposed on an outside of the central shaft.

In one or more embodiments disclosed herein, the first component comprises a central shaft, the second component comprises a housing, and the profile is disposed on an inside of the housing.

In one or more embodiments disclosed herein, the first component is a receiver assembly and the second component is a tool adapter.

In one or more embodiments disclosed herein, a rotation of the ring coupler is around a central axis of the tool coupler.

In one or more embodiments disclosed herein, the ring coupler is a single component forming a complete ring.

In one or more embodiments disclosed herein, the actuator is fixedly connected to the housing.

In one or more embodiments disclosed herein, the ring coupler is configured to rotate relative to the housing, to move translationally relative to the housing, or to both rotate and move translationally relative to the housing.

In one or more embodiments disclosed herein, the actuator is functionally connected to the ring coupler to cause the ring coupler to rotate relative to the housing, to move translationally relative to the housing, or to both rotate and move translationally relative to the housing.

In one or more embodiments disclosed herein, the first component further comprises a central stem having an outer diameter less than an inner diameter of the central shaft.

In one or more embodiments disclosed herein, when the first component is coupled to the second component, the central stem and the central shaft share a central bore.

In one or more embodiments disclosed herein, the housing includes mating features disposed on an interior of the housing and complementary to the profile.

In one or more embodiments disclosed herein, the profile and the housing mating features are configured to transfer torque between the first component and the second component.

In one or more embodiments disclosed herein, when the first component is coupled to the second component, the housing mating features are interleaved with features of the profile.

In one or more embodiments disclosed herein, the profile includes convex features on an outside of the central shaft.

In one or more embodiments disclosed herein, the profile comprises a plurality of splines that run vertically along an outside of the central shaft.

In one or more embodiments disclosed herein, the splines are distributed symmetrically about a central axis of the central shaft.

In one or more embodiments disclosed herein, each of the splines have a same width.

In one or more embodiments disclosed herein, the profile comprises at least two discontiguous sets of splines distributed vertically along the outside of the central shaft.

In one or more embodiments disclosed herein, the mating features comprise a plurality of mating features that run vertically along an interior thereof.

In one or more embodiments disclosed herein, the mating features include convex features on an inner surface of the ring coupler.

In one or more embodiments disclosed herein, the mating features are distributed symmetrically about a central axis of the ring coupler.

In one or more embodiments disclosed herein, each of the mating features are the same width.

In one or more embodiments disclosed herein, the ring coupler comprises cogs distributed on an outside thereof.

In one or more embodiments disclosed herein, the actuator has gearing that meshes with the cogs.

In one or more embodiments disclosed herein, the actuator comprises at least one of a worm drive and a hydraulic cylinder.

In one or more embodiments disclosed herein, the housing has a linear rack on an interior thereof; the ring coupler has threading on an outside thereof; and the ring coupler and the linear rack are configured such that rotation of the ring coupler causes the ring coupler to move translationally relative to the housing.

In one or more embodiments disclosed herein, the first component further comprises a second ring coupler; the actuator is configured to drive the ring coupler to rotate about a central axis; and the ring coupler is configured to drive the second ring coupler to move translationally relative to the housing.

In one or more embodiments disclosed herein, the first component further comprises a second actuator and a second ring coupler.

In one or more embodiments disclosed herein, the second actuator is functionally connected to the second ring coupler.

In one or more embodiments disclosed herein, the second actuator is functionally connected to the ring coupler.

In one or more embodiments disclosed herein, the first component further comprises a wedge bushing below the ring coupler.

In one or more embodiments disclosed herein, the first component further comprises an external indicator indicative of an orientation of the ring coupler.

In one or more embodiments disclosed herein, the first component further comprises a second ring coupler and a second actuator; and the second actuator is functionally connected to the second ring coupler to cause the second ring coupler to move translationally relative to the ring coupler.

In one or more embodiments disclosed herein, the second ring coupler is rotationally fixed to the ring coupler.

In one or more embodiments disclosed herein, the profile comprises a first set of splines and a second set of splines, each distributed vertically along the outside of the central shaft; and the first set of splines is discontiguous with the second set of splines.

In one or more embodiments disclosed herein, the ring coupler includes mating features on an interior thereof that are complementary with the first set of splines; and the second ring coupler includes mating features on an interior thereof that are complementary with the second set of splines.

In one or more embodiments disclosed herein, when the central shaft is inserted into the housing, the first set of splines is between the ring coupler and the second ring coupler.

In one or more embodiments disclosed herein, the second ring coupler is capable of pushing downwards on the first set of splines; and the second ring coupler is capable of pushing upwards on the second set of splines.

In one or more embodiments disclosed herein, the second actuator comprises an upwards actuator that is capable of applying an upwards force on the second ring coupler, and a downwards actuator that is capable of applying a downwards force on the second ring coupler.

In one or more embodiments disclosed herein, the actuator comprises an upwards actuator that is capable of applying an upwards force on the ring coupler, and the second actuator comprises a downwards actuator that is capable of applying a downwards force on the second ring coupler.

In an embodiment, a method of coupling a first component to a second component includes inserting a central shaft of the first component into a housing of the second component; rotating a ring coupler around the central shaft; and engaging mating features of the ring coupler with a profile, wherein the profile is on an outside of the central shaft or an inside of the housing.

In one or more embodiments disclosed herein, the first component is a tool adapter and the second component is a receiver assembly.

In one or more embodiments disclosed herein, the method also includes, after engaging the mating features, longitudinally positioning a tool stem connected to the central shaft.

In one or more embodiments disclosed herein, the method also includes detecting when inserting the central shaft into the housing has completed.

In one or more embodiments disclosed herein, the profile comprises a plurality of splines distributed on an outside of the central shaft.

In one or more embodiments disclosed herein, the method also includes sliding the ring coupler mating features between the splines.

In one or more embodiments disclosed herein, the method also includes sliding a plurality of housing mating features between the splines.

In one or more embodiments disclosed herein, the method also includes, prior to inserting the central shaft, detecting an orientation of the splines relative to mating features of the housing.

In one or more embodiments disclosed herein, an actuator drives the ring coupler to rotate about a central axis of the ring coupler.

In one or more embodiments disclosed herein, rotating the ring coupler comprises rotation of less than a full turn.

In one or more embodiments disclosed herein, the method also includes, after engaging the mating features with the profile, transferring at least one of torque and load between the first component and the second component.

In one or more embodiments disclosed herein, the profile comprises an upper set and a lower set of splines distributed vertically along the outside of the central shaft; and the ring coupler rotates between the two sets of splines.

In one or more embodiments disclosed herein, the method also includes interleaving the lower set of splines with a plurality of housing mating features.

In one or more embodiments disclosed herein, the method also includes, after engaging the ring coupler mating features with the profile: transferring torque between the lower set of splines and the housing mating features, and transferring load between the upper set of splines and the ring coupler mating features.

In an embodiment, a method of coupling a first component to a second component includes inserting a central shaft of the first component into a housing of the second component; rotating a first ring coupler around the central shaft; and clamping a profile using the first ring coupler and a second ring coupler, wherein the profile is on an outside of the central shaft or an inside of the housing.

In one or more embodiments disclosed herein, the first component is a tool adapter and the second component is a receiver assembly.

In one or more embodiments disclosed herein, the method also includes, after rotating the first ring coupler, rotating a third ring coupler around the central shaft, wherein: rotating the first ring coupler comprises rotation of less than a full turn, and rotating the third ring coupler comprise rotation of more than a full turn.

In one or more embodiments disclosed herein, rotating the first ring coupler causes rotation of the second ring coupler.

In one or more embodiments disclosed herein, the method also includes, after rotating the first ring coupler, moving the second ring coupler translationally relative to the housing.

In one or more embodiments disclosed herein, the method also includes, after rotating the first ring coupler: rotating a third ring coupler around the central shaft; and moving the second ring coupler and the third ring coupler translationally relative to the housing.

In one or more embodiments disclosed herein, the method also includes, after clamping the profile, transferring at least one of torque and load between the first component and the second component.

In an embodiment, a method of coupling a first component to a second component includes inserting a central shaft of the first component into a housing of the second component; rotating a first ring coupler around the central shaft; and moving a second ring coupler vertically relative to the housing to engage a profile, wherein the profile is on an outside of the central shaft or an inside of the housing.

In one or more embodiments disclosed herein, the first component is a tool adapter and the second component is a receiver assembly.

In one or more embodiments disclosed herein, engaging the profile comprises at least one of: clamping first splines of the profile between the first ring coupler and the second ring coupler; and pushing upwards on second splines of the profile.

In one or more embodiments disclosed herein, engaging the profile comprises both, at different times: pushing downward on first splines of the profile; and pushing upwards on second splines of the profile.

In one or more embodiments disclosed herein, the method also includes supporting a load from the first splines of the profile with the first ring coupler.

While the foregoing is directed to embodiments of the present invention, other and further embodiments of the invention may be devised without departing from the basic scope thereof, and the scope thereof is determined by the claims that follow.

The invention claimed is:

1. A tool coupler, comprising:
a first component rotatable about a central axis, the first component including:
a housing;
a ring coupler disposed in the housing, wherein the ring coupler including an interior surface defining a central bore, wherein the interior surface includes mating features; and
an actuator functionally connected to the ring coupler to rotate the ring coupler between a first position and a second position relative to the housing; and
a second component having a profile complementary to the mating features of the ring coupler, wherein the profile is insertable in the central bore;
wherein the ring coupler is rotatable between the first and second positions when the profile is inserted in the central bore.

2. The tool coupler of claim 1, wherein:
when the ring coupler is in the first position, the mating features do not engage the profile; and
when the ring coupler is in the second position, the mating features engage the profile to couple the first component to the second component.

3. The tool coupler of claim 1, wherein:
the second component comprises a central shaft, and
the profile is disposed on an outside of the central shaft.

4. The tool coupler of claim 3, wherein:
the ring coupler comprises cogs distributed on an outside thereof; and
the actuator has gearing that meshes with the cogs.

5. The tool coupler of claim 3, wherein:
the housing has a linear rack on an interior thereof;
the ring coupler has threading on an outside thereof; and
the ring coupler and the linear rack are configured such that rotation of the ring coupler causes the ring coupler to move translationally relative to the housing.

6. The tool coupler of claim 3, wherein:
the first component further comprises a second ring coupler;
the actuator is configured to drive the ring coupler to rotate about the central axis; and
the ring coupler is configured to drive the second ring coupler to move translationally relative to the housing.

7. The tool coupler of claim 3, wherein:
the first component further comprises a second ring coupler and a second actuator;
the second actuator is functionally connected to the second ring coupler to cause the second ring coupler to move translationally relative to the ring coupler;
the profile comprises a first set of splines and a second set of splines, each distributed vertically along the outside of the central shaft; and
the first set of splines is discontiguous with the second set of splines.

8. The tool coupler of claim 7, wherein:
the mating features of the ring coupler are complementary with the first set of splines; and
the second ring coupler includes mating features on an interior thereof that are complementary with the second set of splines.

9. The tool coupler of claim 7, wherein, when the central shaft is inserted into the housing, the first set of splines is between the ring coupler and the second ring coupler.

10. The tool coupler of claim 9, wherein the second actuator comprises an upwards actuator that is capable of applying an upwards force on the second ring coupler, and a downwards actuator that is capable of applying a downwards force on the second ring coupler.

11. The tool coupler of claim 9, wherein the actuator comprises an upwards actuator that is capable of applying an upwards force on the ring coupler, and the second actuator comprises a downwards actuator that is capable of applying a downwards force on the second ring coupler.

12. The tool coupler of claim 1, wherein the first component is a receiver assembly and the second component is a tool adapter.

13. A method of coupling a first component to a second component comprising:
    inserting a central shaft of the first component into both a housing of the second component and a ring coupler of the second component, the ring coupler having mating features on an interior thereof;
        rotating the ring coupler around the central shaft while the central shaft is inserted into the ring coupler to engage the mating features of the ring coupler with a profile on an outside of the central shaft; and
    rotating the first component and the second component about a central axis.

14. The method of claim 13, wherein the first component is a tool adapter and the second component is a receiver assembly.

15. The method of claim 14, further comprising, after engaging the mating features, longitudinally positioning a tool stem connected to the central shaft.

16. The method of claim 13, further comprising detecting when inserting the central shaft into the housing has completed.

17. The method of claim 13, wherein the profile comprises a plurality of splines distributed on an outside of the central shaft, the method further comprising at least one of:
    sliding the ring coupler mating features between the splines;
    sliding a plurality of housing mating features between the splines; and
    prior to inserting the central shaft, detecting an orientation of the splines relative to mating features of the housing.

18. The method of claim 13, wherein:
    the profile comprises an upper set of splines and a lower set of splines distributed vertically along the outside of the central shaft; and
    the ring coupler rotates between the two sets of splines.

19. The method of claim 18, further comprising,
    interleaving the lower set of splines with a plurality of housing mating features; and
    after engaging the ring coupler mating features with the profile:
    transferring torque between the lower set of splines and the housing mating features, and
    transferring load between the upper set of splines and the ring coupler mating features.

20. A method of coupling a first component to a second component comprising:
    inserting a central shaft of the first component into a housing of the second component;
    rotating a first ring coupler around the central shaft, wherein the first ring coupler is disposed in the housing;
    clamping a profile using the first ring coupler and a second ring coupler, wherein the profile is on an outside of the central shaft; and
    wherein the first ring coupler is rotated by an actuator, and wherein the actuator is disposed within the housing.

21. The method of claim 20, wherein the first component is a tool adapter and the second component is a receiver assembly.

22. The method of claim 20, further comprising, after rotating the first ring coupler, moving the second ring coupler translationally relative to the housing.

23. The method of claim 20, further comprising, after rotating the first ring coupler:
    rotating a third ring coupler around the central shaft; and
    moving the second ring coupler and the third ring coupler translationally relative to the housing.

24. A method of coupling a first component to a second component comprising:
    inserting a central shaft of the first component into a housing of the second component;
    rotating a first ring coupler around the central shaft, wherein the first ring coupler is disposed in the housing;
    moving a second ring coupler vertically relative to the housing to engage a profile on an outside of the central shaft; and
    wherein the first ring coupler is rotated by an actuator, and wherein the actuator is disposed within the housing.

25. The method of claim 24, wherein the first component is a tool adapter and the second component is a receiver assembly.

26. A tool coupler, comprising:
    a first component having:
        a housing;
        a ring coupler having mating features and rotatable between a first position and a second position, wherein the ring coupler comprises cogs distributed on an outside thereof; and
        an actuator functionally connected to the ring coupler to rotate the ring coupler between the first position and the second position, wherein the actuator has gearing that meshes with the cogs; and
    a second component having a profile complementary to the ring coupler, the second component comprises a central shaft, wherein the profile is disposed on an outside of the central shaft.

27. The tool coupler of claim 26, wherein the cogs are axially extending.

* * * * *